US008104583B2

(12) United States Patent
Rekow et al.

(10) Patent No.: US 8,104,583 B2
(45) Date of Patent: Jan. 31, 2012

(54) MATERIALS HANDLING VEHICLE WITH IMPROVED VISIBILITY

(75) Inventors: Craig J. Rekow, Troy, OH (US); Ryan R. Berger, Columbus, OH (US); Thornton K. Lothrop, Worthington, OH (US); Roger J. Quinlan, Jr., Troy, OH (US); William C. Jones, Jr., Greenville, OH (US)

(73) Assignee: Crown Equipment Corporation, New Bremen, OH (US)

( * ) Notice: Subject to any disclaimer, the term of this patent is extended or adjusted under 35 U.S.C. 154(b) by 780 days.

(21) Appl. No.: 11/557,545

(22) Filed: Nov. 8, 2006

(65) Prior Publication Data

US 2007/0205056 A1 Sep. 6, 2007

Related U.S. Application Data

(60) Provisional application No. 60/735,806, filed on Nov. 10, 2005.

(51) Int. Cl.
*B66F 9/06* (2006.01)
*B66F 9/075* (2006.01)
*B60R 21/00* (2006.01)
*B62D 61/06* (2006.01)

(52) U.S. Cl. ........ 187/222; 187/227; 414/629; 414/631; 414/635; 414/663; 414/914; 280/62; 280/755; 280/756; 180/211

(58) Field of Classification Search .................. 187/226, 187/227, 233, 238, 222; 414/629, 631, 632, 414/634, 635, 914; 280/47.11, 62, 756; 180/13, 180/211; *B66F 9/06, 9/075, 9/10*
See application file for complete search history.

(56) References Cited

U.S. PATENT DOCUMENTS

| | | | | |
|---|---|---|---|---|
| 2,456,320 | A * | 12/1948 | Repke | 414/635 |
| 3,240,372 | A * | 3/1966 | Joyce et al. | 414/631 |
| 3,298,463 | A * | 1/1967 | McIntosh | 187/227 |
| 3,616,953 | A * | 11/1971 | Shaffer et al. | 414/631 |
| 3,968,859 | A | 7/1976 | Ehrhardt | |
| 4,207,967 | A | 6/1980 | Stedman | |
| 4,374,550 | A * | 2/1983 | Bartow | 187/227 |

(Continued)

FOREIGN PATENT DOCUMENTS

EP 0 650 921 A1 5/1995

(Continued)

OTHER PUBLICATIONS

Photo of the Raymond truck.

(Continued)

*Primary Examiner* — Michael Mansen
*Assistant Examiner* — Stefan Kruer
(74) *Attorney, Agent, or Firm* — Stevens & Showalter LLP

(57) ABSTRACT

A materials handling vehicle is provided comprising a power unit, a mast assembly and a fluid supply system. The mast assembly is coupled to the power unit. The mast assembly comprises a weldment, a movable element and a ram/cylinder assembly coupled to the movable element to effect movement of the element. The fluid supply system includes manifold apparatus and at least one fluid line coupled to the manifold apparatus and the ram/cylinder assembly. The manifold apparatus provides pressurized hydraulic fluid to the ram/cylinder assembly via the fluid line to raise the movable element. The manifold apparatus is mounted to the mast assembly.

16 Claims, 19 Drawing Sheets

U.S. PATENT DOCUMENTS

| | | | | | |
|---|---|---|---|---|---|
| 4,600,084 | A | | 7/1986 | Rau | |
| 4,919,233 | A | * | 4/1990 | Larsen et al. | 187/227 |
| 5,325,935 | A | * | 7/1994 | Hirooka et al. | 180/211 |
| 5,890,563 | A | * | 4/1999 | Avitan et al. | 187/228 |
| 6,182,797 | B1 | * | 2/2001 | Tebbe et al. | 187/227 |
| 6,595,329 | B1 | * | 7/2003 | Gotz | 187/228 |
| D480,858 | S | * | 10/2003 | Sellar | D34/34 |
| 6,901,323 | B2 | * | 5/2005 | Kokura | 701/50 |
| D539,503 | S | * | 3/2007 | Quinlan et al. | D34/35 |
| 7,320,385 | B2 | * | 1/2008 | Katae et al. | 187/227 |
| 2005/0034928 | A1 | * | 2/2005 | Lewis et al. | 187/230 |
| 2006/0070816 | A1 | * | 4/2006 | Schroder | 187/222 |

FOREIGN PATENT DOCUMENTS

| | | | | |
|---|---|---|---|---|
| EP | 1 505 033 | A1 | | 2/2005 |
| JP | 05 078096 | A | | 3/1993 |
| JP | 2001213594 | A | * | 8/2001 |
| JP | 2003 267682 | A | | 9/2003 |
| JP | 2005200201 | A | * | 7/2005 |

OTHER PUBLICATIONS

Photo of the Yale truck.

Photo of the Crown truck.

* cited by examiner

MATERIALS HANDLING VEHICLE WITH IMPROVED VISIBILITY

This application claims the benefit of U.S. Provisional Patent Application Ser. No. 60/735,806, filed Nov. 10, 2005, and entitled "A MATERIALS HANDLING VEHICLE WITH IMPROVED VISIBILITY," the disclosure of which is incorporated herein by reference.

TECHNICAL FIELD

The present invention relates to a materials handling vehicle comprising a manifold apparatus mounted on a mast assembly and further including a frame provided with a recess to enhance operator visibility.

BACKGROUND OF THE INVENTION

Materials handling vehicles are known in the prior art comprising a power unit and a mast assembly. The mast assembly may comprise first, second and third mast weldments, wherein the second mast weldment is capable of moving relative to the first mast weldment and the third mast weldment is capable of moving relative to the second mast weldment. First and second lift ram/cylinder assemblies are coupled between the first and second mast weldments for effecting movement of the second and third mast weldments relative to the first mast weldment. Coupled to the third mast weldment is a movable fork carriage assembly. A further ram/cylinder unit is provided for effecting movement of the fork carriage assembly relative to the third mast weldment.

The power unit includes manifold apparatus mounted on a front portion of a frame of the power unit. The manifold apparatus includes valve structure for controlling fluid flow to the first and second ram/cylinder assemblies coupled between the first and second weldments and the ram/cylinder assembly coupled between the third weldment and the fork carriage assembly. The manifold apparatus further includes valve structure for controlling fluid flow to ram/cylinder assemblies for tilting the mast assembly relative to the power unit and at least one auxiliary device such as a fork side shift mechanism, a carton clamp, a fork reach mechanism, a paper roll clamp or a slip sheet device.

The truck may further include a manifold on the fork carriage assembly including one or two mechanical cross-over relief valves for diverting hydraulic fluid from a corresponding auxiliary device to a fluid storage reservoir if the fluid pressure provided to the corresponding auxiliary device exceeds a threshold value. One or more mechanical valves for limiting the maximum rate of descent of the fork carriage assembly and the second and third mast weldments may also be provided in the manifold provided on the fork carriage assembly.

It is also known in another prior art materials handling vehicle to provide a manifold apparatus mounted on a fork carriage assembly having first and second auxiliary select valves, which valves are electronically controlled ON/OFF valves for selecting operation of a desired auxiliary unit. It is noted that fluid flow to the selected auxiliary device is controlled via a valve mounted in a manifold apparatus on a power unit.

It is further known to provide a manifold apparatus on a carriage of a reach truck. The manifold apparatus includes structure for selecting functions such as tilt, side shift and reach. Fluid flow rate is not controlled by valve structure contained in the manifold apparatus on the carriage. Instead valves are provided in a manifold mounted on a power unit for controlling fluid flow for those functions.

It is still further known in a prior art materials handling vehicle to provide a manifold apparatus on a first weldment of a mast assembly, wherein the first weldment does not move vertically. The manifold apparatus comprises one or more mechanical valves for limiting the maximum rate of descent of a fork carriage assembly and second and third mast weldments.

It would be desirable to mount a manifold apparatus on a mast assembly, which manifold apparatus performs functions typically performed by manifolds mounted on a power unit so as to reduce the volume or size of the power unit.

SUMMARY OF THE INVENTION

In accordance with a first aspect, a materials handling vehicle is provided comprising a power unit, a mast assembly and a fluid supply system. The mast assembly is coupled to the power unit. The mast assembly comprises a weldment, a movable element and a ram/cylinder assembly coupled to the movable element to effect movement of the element. The fluid supply system includes manifold apparatus and at least one fluid line coupled to the manifold apparatus and the ram/cylinder assembly. The manifold apparatus includes valve structure to provide pressurized hydraulic fluid to the ram/cylinder assembly via the fluid line to raise the movable element. The manifold apparatus is mounted to the mast assembly.

In one embodiment, the weldment may comprise a first weldment and the movable element may comprise a second weldment movable relative to the first weldment.

The weldment may comprise a first weldment not capable of moving vertically relative to the power unit and wherein the manifold apparatus may be mounted to the first weldment. The mast assembly may further comprise a second weldment which moves relative to the first weldment, a third weldment which moves relative to the second weldment, and first and second lift ram/cylinder assemblies for effecting movement of the second and third weldments. The fluid supply system may further comprise at least one fluid line coupled to each of the first and second lift ram/cylinder assemblies and the manifold apparatus for defining pathways for pressurized fluid to move from the manifold apparatus to the first and second lift assemblies. In this embodiment, the movable element may comprise a fork carriage assembly.

In accordance with a second aspect, a materials handling vehicle is provided comprising a power unit, a mast assembly including at least one weldment, an auxiliary device associated with the mast assembly, tilt ram cylinder structure coupled to the mast assembly and a fluid supply system. The fluid supply system includes manifold apparatus and fluid lines coupled to the manifold apparatus and the auxiliary device and tilt ram cylinder structure. The manifold apparatus includes valve structure for controlling the rate of fluid flow to one of the auxiliary device and tilt ram cylinder structure. The manifold apparatus is mounted to the mast assembly.

In accordance with a third aspect, a materials handling vehicle is provided comprising a power unit comprising a frame including an operator's compartment, a mast assembly coupled to the frame, and wherein the frame includes a front recess so as to allow an operator to view an end portion of the frame when driving the vehicle.

The power unit further comprises a front hood plate which may have a maximum height from ground of less than or equal to about 1124 mm.

The front hood plate may slope downwardly at an angle of about 18 degrees.

The recess may be located in a corner of the frame. The frame may include only a single recess.

The end portion of the frame may comprise a front end portion of the frame.

The frame end portion may comprise an end portion of a fender provided over a front wheel of the vehicle.

The materials handling vehicle may further include an overhead guard and first and second pillars for coupling the overhead guard to the power unit. Preferably, at least one of the pillars is positioned substantially in-line with the mast assembly. The mast assembly may include at least one weldment having first and second vertical rails. Preferably, the one pillar is substantially in-line with one of the vertical rails of the one weldment. More preferably, each of the first and second pillars is substantially in-line with a corresponding one of the vertical rails of the one weldment.

DETAILED DESCRIPTION OF THE INVENTION

Figure 1:
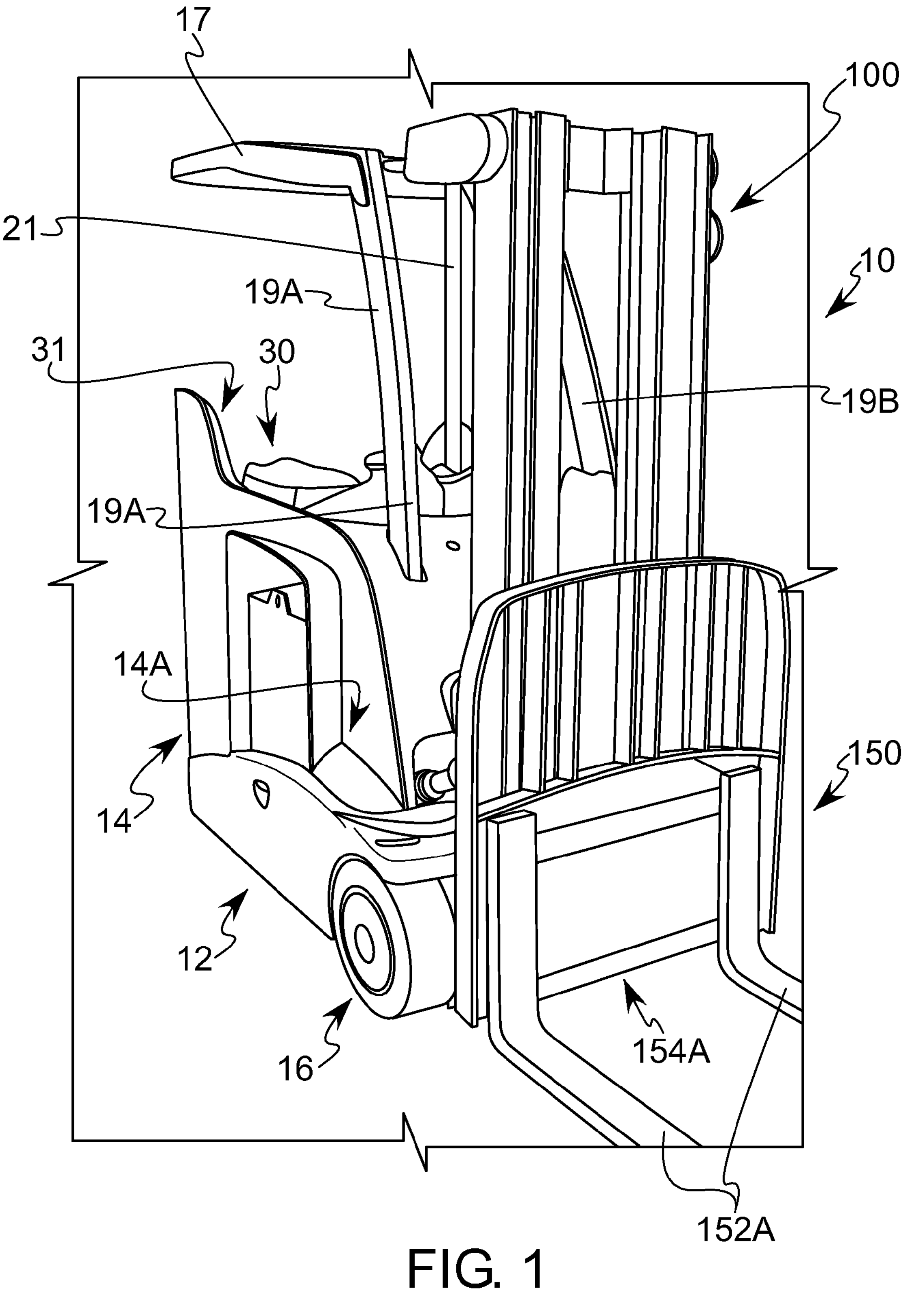
FIG. 1 is a perspective view of a truck comprising a power unit including a frame with a recess in a front portion.

Reference is now made to FIGS. 1 and 1A-1C, which illustrate a three-wheel stand-up counterbalanced fork lift truck 10. A mast assembly 100, a fork carriage assembly 150, a fork carriage assembly lift unit 200, and a hydraulic fluid supply system 300 including a manifold apparatus 500 are incorporated into the truck 10, see also FIGS. 2 and 5. While the present invention is described herein with reference to the stand-up counterbalanced truck 10, it will be apparent to those skilled in the art that the invention and variations of the invention can be more generally applied to a variety of other materials handling vehicles including a reach truck.

The fork lift truck 10 further includes a main body or power unit 12 which includes a frame 14, first and second driven wheels 16 coupled to a front portion of the frame 14, and a third steerable wheel (not shown) coupled to a rear portion of the frame 14. The first, second and third wheels allow the truck 10 to move across a floor surface.

A rider compartment 30 is located within the main body frame 14 for receiving an operator. The speed and direction of movement (forward or reverse) of the truck 10 can be controlled by the operator via a multifunction controller MFC. Steering is effected via a tiller 116A.

Figure 1A:
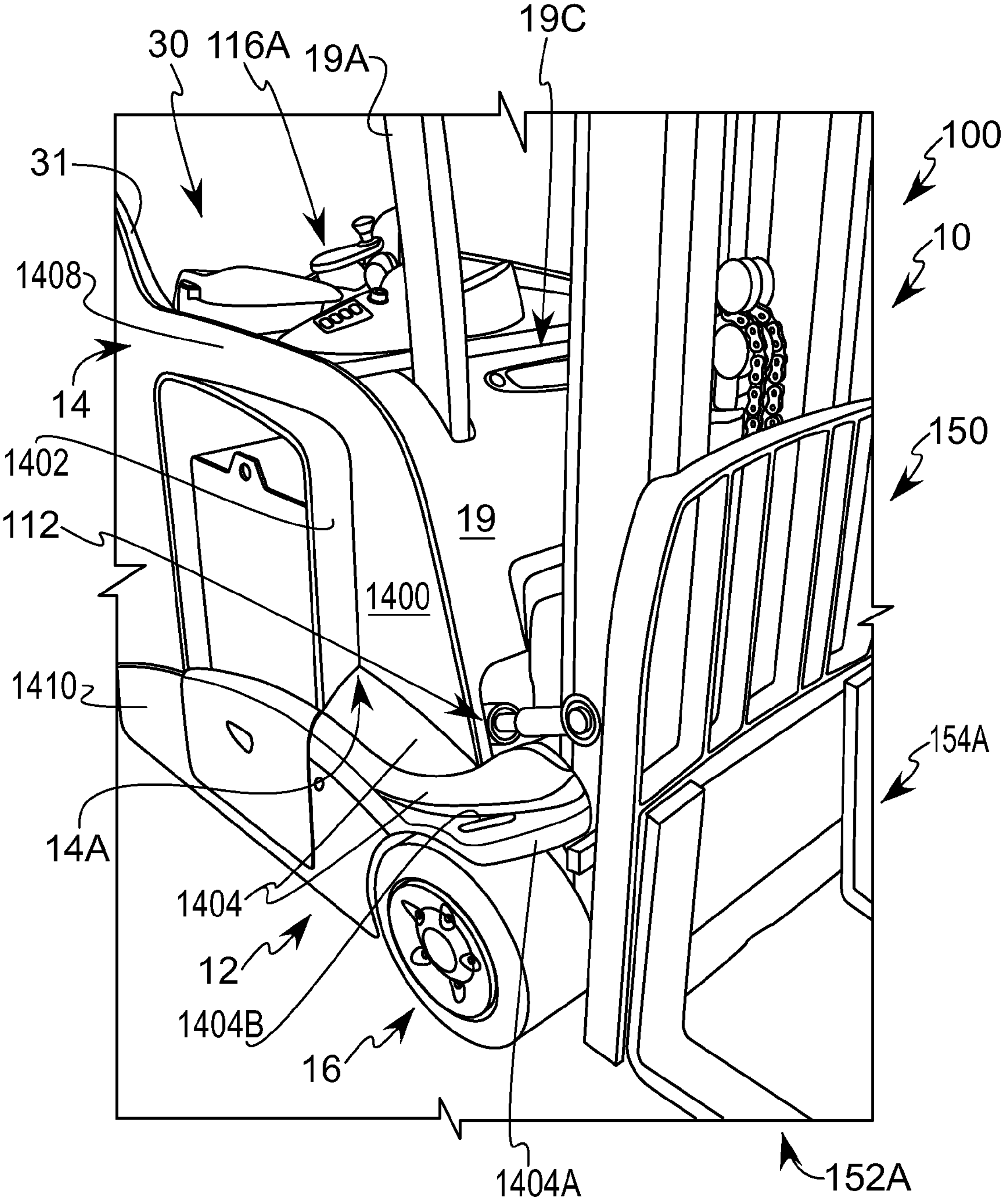
FIG. 1A is an enlarged view of a portion of the truck illustrated in FIG. 1.
Figure 1B:
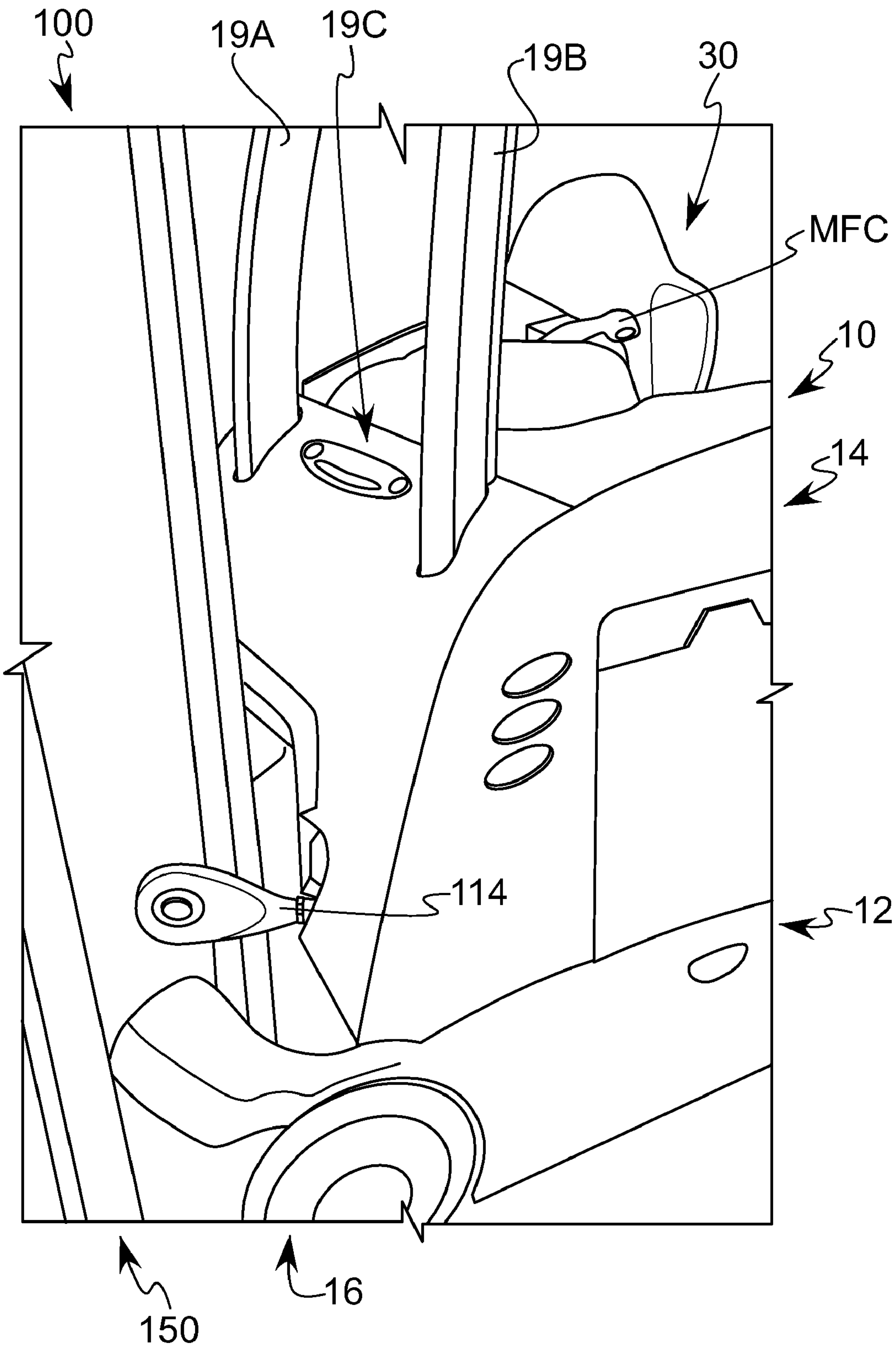
FIG. 1B is a perspective view of a portion of the truck illustrated in FIG. 1 and taken from a side opposite to that illustrated in FIG. 1A.
Figure 1C:
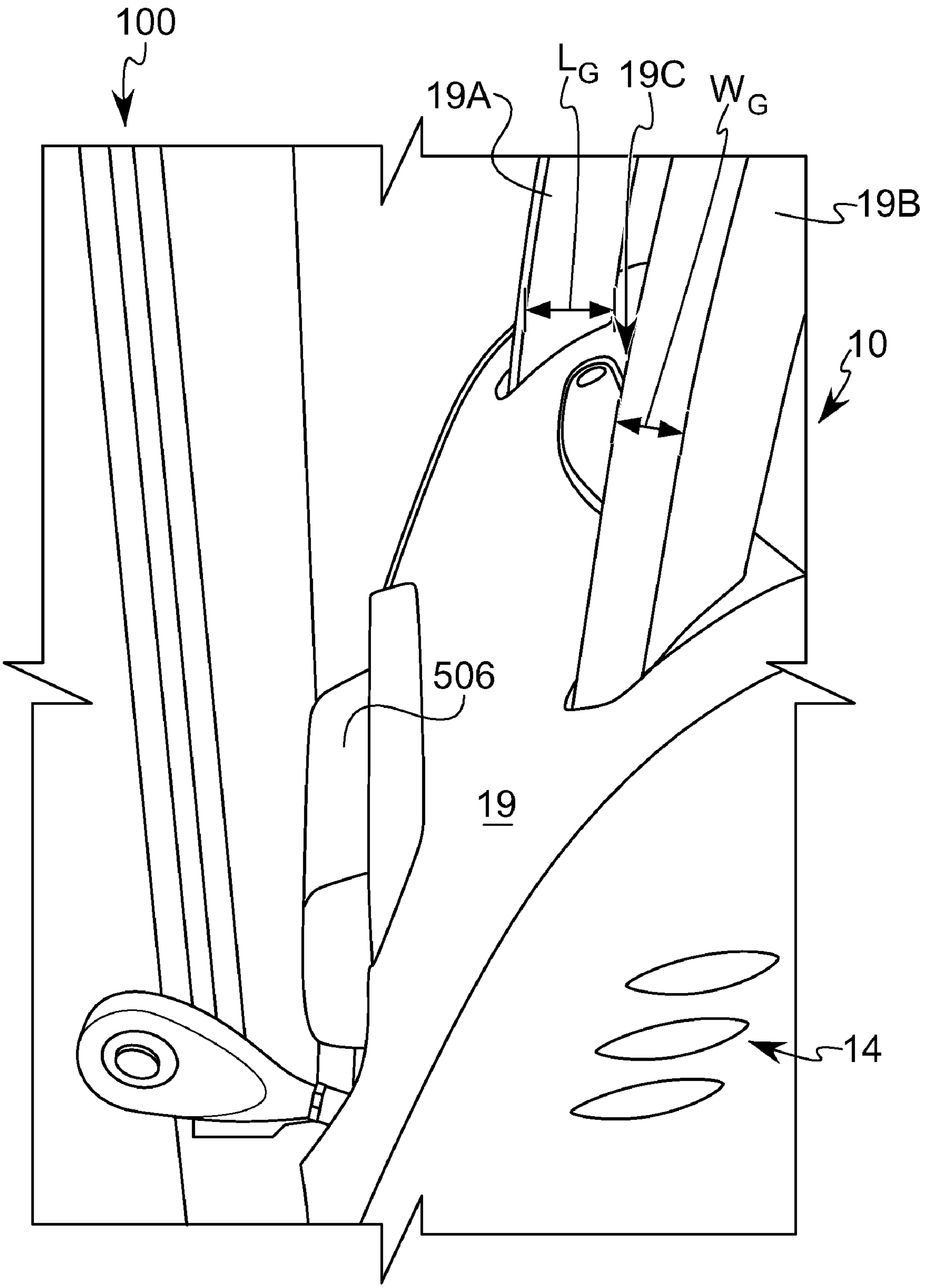
FIG. 1C is a view of the truck illustrating of a cowl plate and manifold apparatus cover.
Figure 1D:
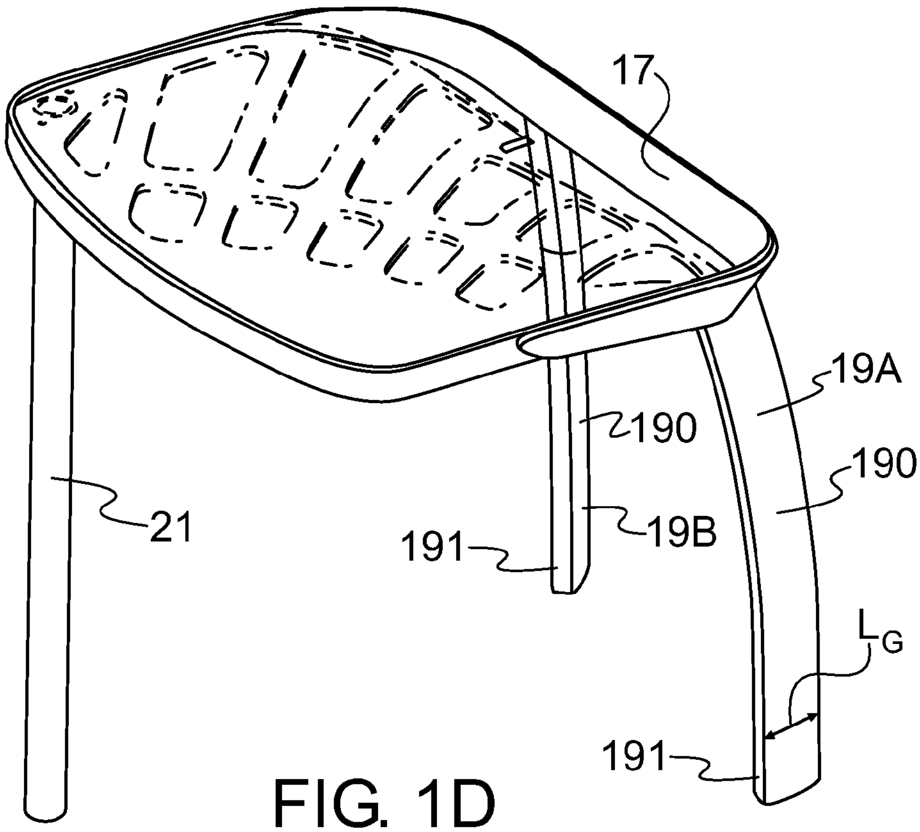
FIG. 1D is a perspective view of an overhead guard of the truck illustrated in FIG. 1.
Figure 1E:
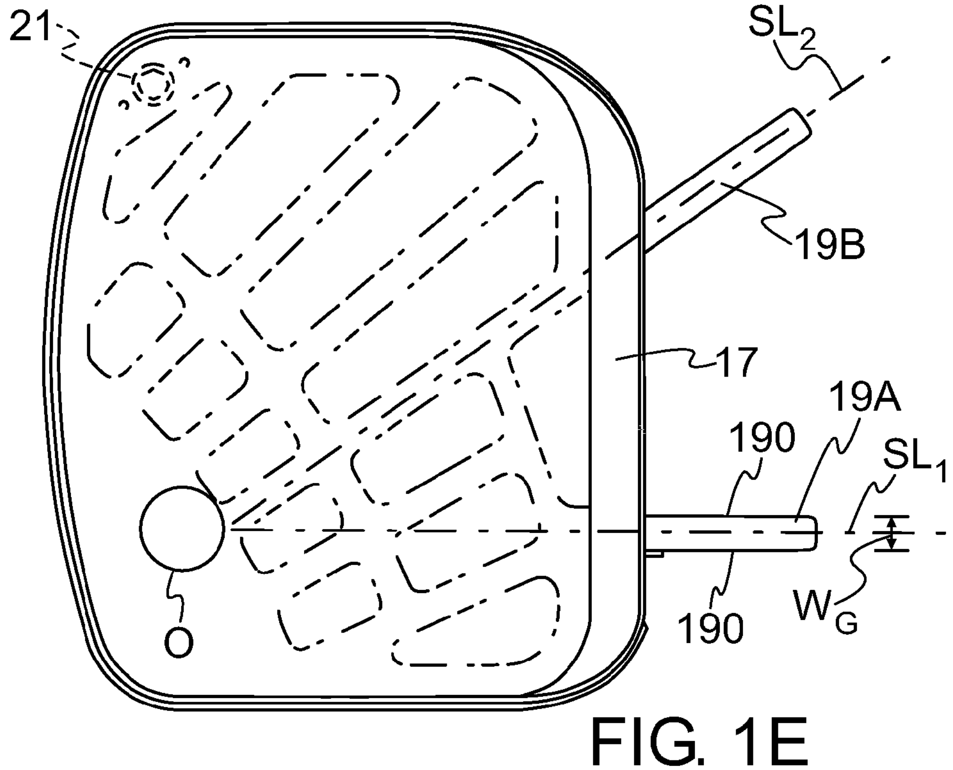
FIG. 1E is a top view of the overhead guard of the truck illustrated in FIG. 1.

The truck 10 further includes an overhead guard 17 coupled to the power unit 12 by first and second A-pillars 19A and 19B and a rear support rod 21, see FIGS. 1 and 1A-1E. In the illustrated embodiment, each of the A-pillars 19A and 19B has a generally rectangular shape. For example, each A-pillar 19A, 19B may have sidewalls 190 having a length $L_G$ of about 4 inches and endwalls 191 having a width $W_G$ of about 2 inches. When an operator is in the operator's compartment 30, he/she will normally rest his/her back against a backrest 31, see FIG. 1. The first A-pillar 19A is angularly located relative to the power unit 12 such that opposing sidewalls 190 of the A-pillar are generally parallel to longitudinal axes of a pair of forks 152A of the fork carriage assembly 150. When an operator O, shown schematically in FIG. 1E, is looking in the direction of the longitudinal axes of the forks 152A, i.e., along a first operator sight line $SL_1$, the operator sees only an end wall 191 of the A-pillar 19A, i.e., the operator O sees little or no portion of either sidewall 190 of the A-pillar 19A. In a similar manner, when an operator rotates his head so as to look along a second sight line $SL_2$, which sight line extends through the second A-pillar 19B, the operator O only sees an endwall 191 of the A-pillar 19B. This is because the A-pillar 19B is rotated or angled relative to the position of the first A-pillar 19A such that the endwall 191 is generally perpendicular to the second sight line $SL_2$ that passes through the A-pillar 19A. Because an operator O only sees an endwall 191 of either A-pillar 19A, 19B during operation of the vehicle 10, and sees little or no portion of any sidewall 190 of either A-pillar 19A, 19B, his/her visibility is enhanced.

Figure 2:
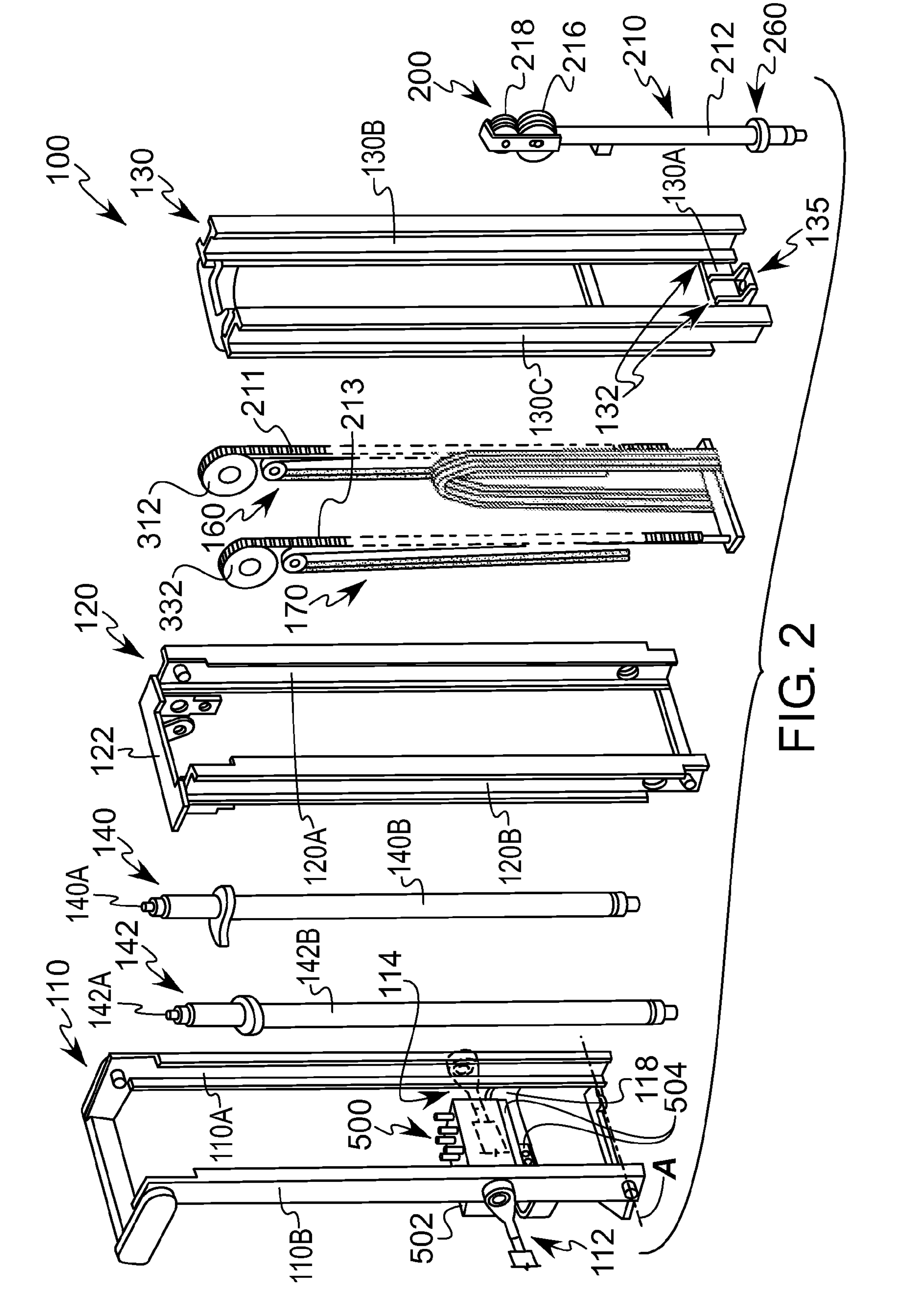
FIG. 2 is an exploded view of the mast assembly of FIG. 1 and illustrating a manifold apparatus.
Figure 3:
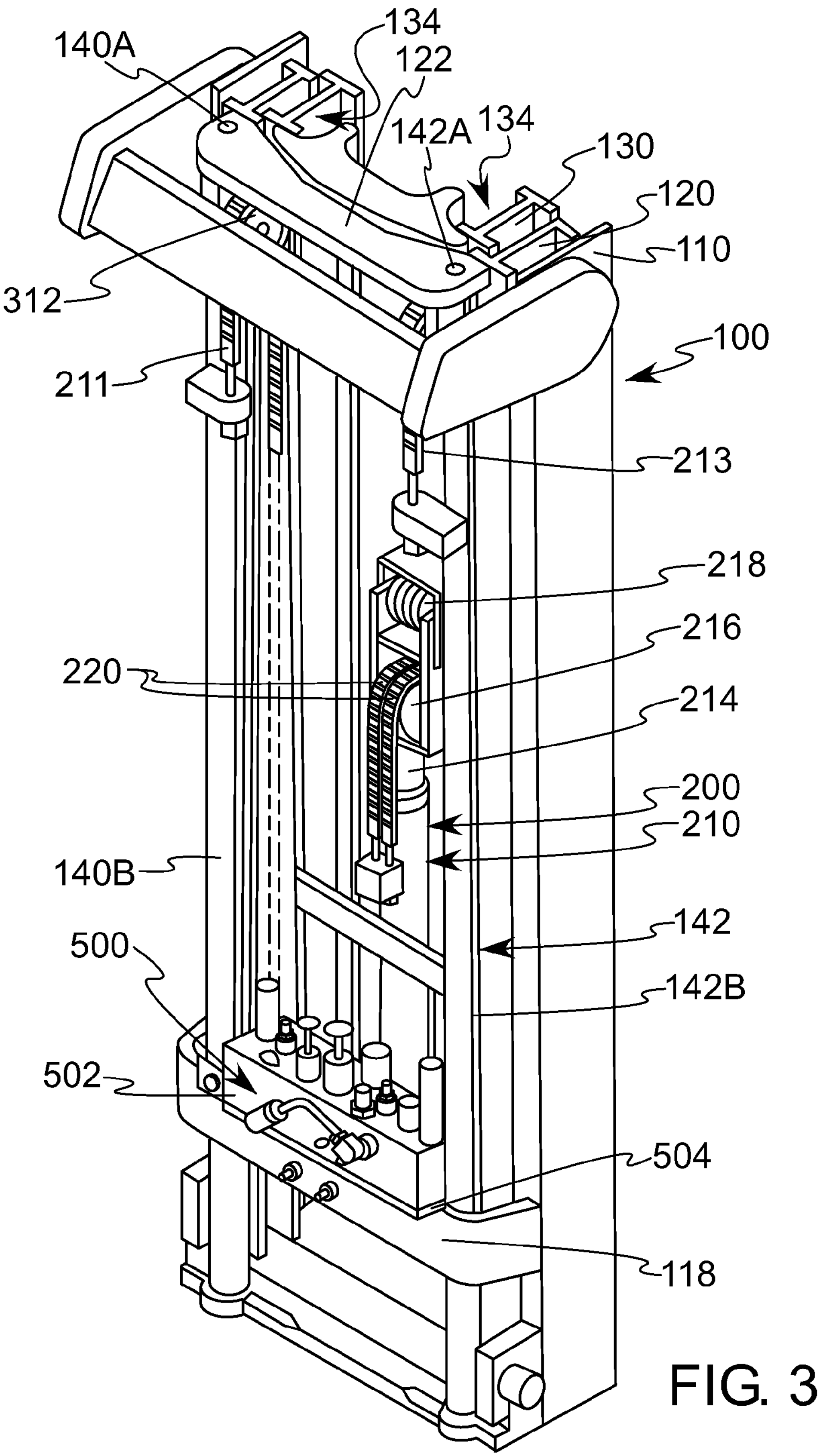
FIG. 3 is a rear perspective view of the mast assembly, manifold apparatus and fork carriage assembly lift unit of the truck illustrated in FIG. 1, with the fork carriage assembly removed.

The mast assembly 100 includes first, second and third mast weldments 110, 120 and 130, see FIG. 3, where the second weldment 120 is nested within the first weldment 110 and the third weldment 130 is nested within the second weldment 120. The first weldment 110 is coupled to the truck main body frame 14. The second or intermediate weldment 120 is capable of vertical movement relative to the first weldment 110. The third or inner weldment 130 is capable of vertical movement relative to the first and second weldments 110 and 120. The first weldment includes first and second vertical rails 110A and 110B, the second weldment 120 includes first and second vertical rails 120A and 120B and the third weldment 130 includes first and second vertical rails 130B and 130C, see FIG. 2.

Figure 1F:
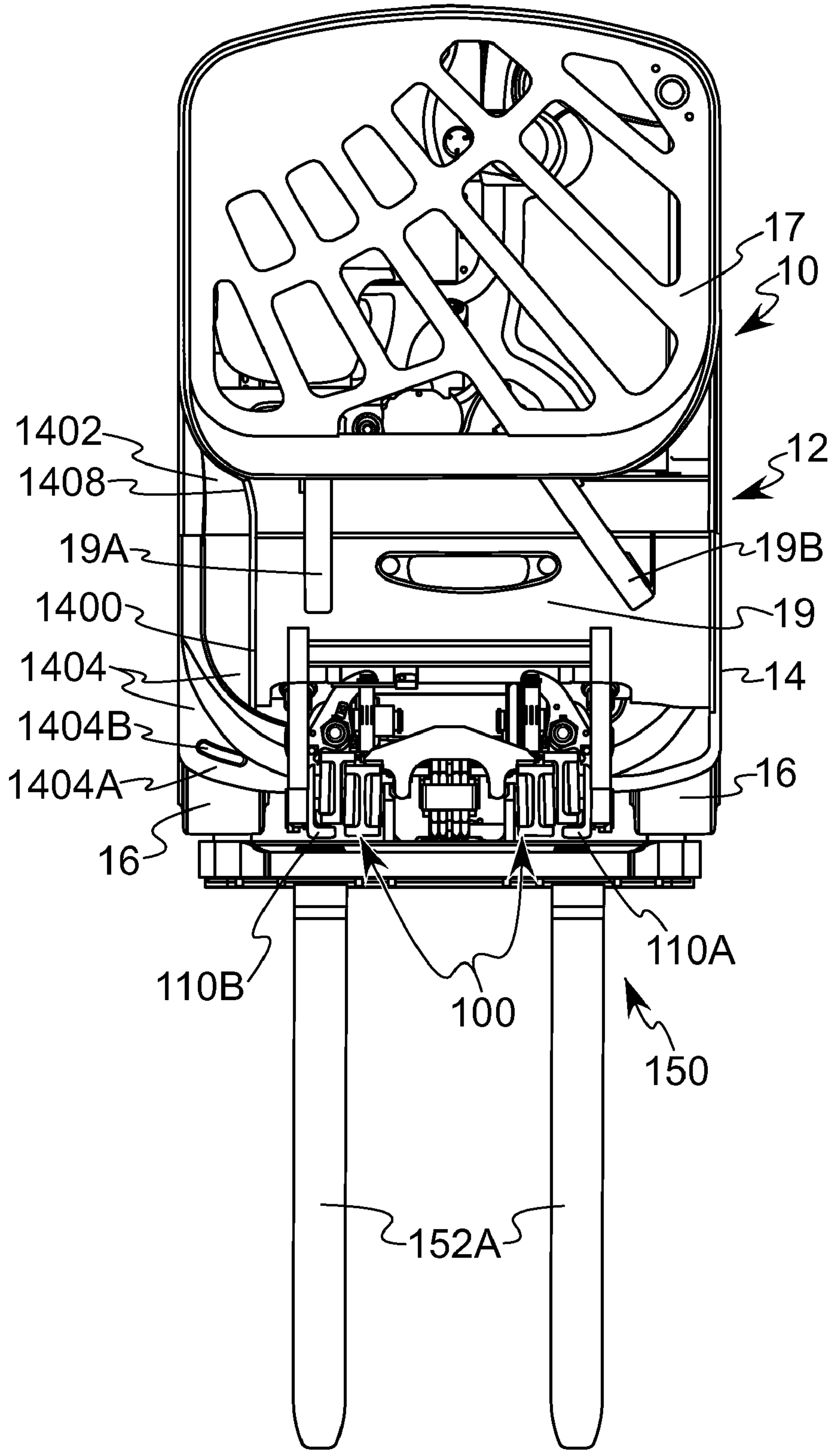
FIG. 1F is a top view of the truck illustrated in FIG. 1.

In the illustrated embodiment, the first A-pillar 19A is positioned so as to be substantially in-line with the vertical rail 110B of the first weldment 110 and the second A-pillar 19B is positioned so as to be substantially in-line with the vertical rail 110A of the first weldment 110 so as to improve operator visibility, see FIG. 1F.

First and second lift ram/cylinder assemblies 140 and 142 are fixed at their cylinders 140B and 142B to the first weldment 110, see FIG. 3. Rams 140A and 142A extending from the cylinders 140B and 142B are fixed to an upper brace 122 of the second weldment 120, see FIG. 3. First and second hydraulic tubes 140C and 142C are coupled to the cylinders 140B and 142B and the manifold apparatus 500, see FIGS. 4 and 5, and define paths for fluid to pass between the manifold apparatus 500 and the cylinders 140B and 142B. A mechanical velocity fuse 1440 is coupled to a base of the cylinder 140B and closes if the second and third fork weldments 120 and 130 descend relative to the first weldment 110 in excess of a predefined speed.

A first chain 211 is fixed to the cylinder 140B of the first ram/cylinder assembly 140 and the second chain 213 is fixed to the cylinder 142B of the second ram/cylinder assembly 142, see FIG. 3. The first chain 211 extends over a first pulley 312 and is coupled to a lower portion 132 of the third weldment 130, see FIG. 2. A second chain 213 extends over a second pulley 332 and is also coupled to the third weldment lower portion 132. The third weldment lower portion 132 may comprise lower portions of the vertical rails 130B and 130C, see FIG. 2, or a lower plate 130A extending between lower portions of the vertical rails 130B and 130C of the third weldment 130. When the rams 140A and 142A of the assemblies 140 and 142 are extended, the rams 140A and 142A lift the second weldment 120 vertically relative to the fixed first weldment 110. Further, the first and second pulleys 312 and 332 fixed to upper brace 122 of the second weldment 120 apply upward forces on the chains 211 and 213 causing the third weldment 130 to move vertically relative to the first and second weldments 110 and 120. For every one unit of vertical movement of the second weldment 120, the third weldment 130 moves vertically two units.

In the illustrated embodiment, first and second tilt ram/cylinder units 112 and 114 are coupled between the truck main body frame 14 and the first weldment 110 so as to pivot the mast assembly 100 approximately 5 degrees from vertical back toward the main body frame 14 and between about 2 to about 5 degrees from vertical away from the main body frame 14, see FIG. 2. First and second hydraulic hoses 113A and 113B are coupled to the first and second tilt ram/cylinder units 112 and 114 and the manifold apparatus 500, see FIG. 5, and define paths for fluid to pass between the manifold apparatus 500 and the tilt units 112 and 114.

The fork carriage assembly 150 comprises the pair of forks 152A and a fork carriage 154A upon which the forks 152A are mounted, see FIGS. 1, 1A and 1B (the fork carriage assembly 150 is not illustrated in FIGS. 2 and 3). The fork carriage 154A is provided with pairs of rollers (not shown), which rollers are received in inner tracks 134 of the third weldment 130, see FIG. 3. The pairs of rollers allow the fork carriage 154A to move vertically up and down relative to the third weldment 130.

The fork carriage assembly lift unit 200 is coupled to the third weldment 130 and the fork carriage assembly 150 to effect vertical movement of the fork carriage assembly 150 relative to the third weldment 130. The lift unit 200 includes a ram/cylinder assembly 210 comprising a cylinder 212 fixed to a bracket 135, which, in turn, is fixed to the plate 130A of the third weldment 130, such that it moves with the third weldment 130, see FIG. 2. A ram 214 is associated with the cylinder 212 and is capable of extending from the cylinder 212 when pressurized hydraulic fluid is provided to the cylinder 212, see FIG. 3. A mechanical pressure compensated flow regulator 1210 is coupled to a base of the cylinder 212 and functions to limit the rate at which the fork carriage assembly 150 is lowered during an unintended descent, see FIG. 5.

First and second pulleys 216 and 218 are coupled to an upper end of the ram 214, see FIGS. 2 and 3. A pair of lift chains 220 are fixed at one end to the cylinder 212, extend over the first pulley 216 and are coupled to a lower portion (not shown) of the fork carriage 154A. When pressurized fluid is provided to the cylinder 212, the ram 214 is extended causing the pulley 216 to move vertically relative to the third weldment 130. Vertical movement of the pulley 216 causes the lift chains 220 to raise the fork carriage assembly 150 relative to the third weldment 130.

Figure 4:
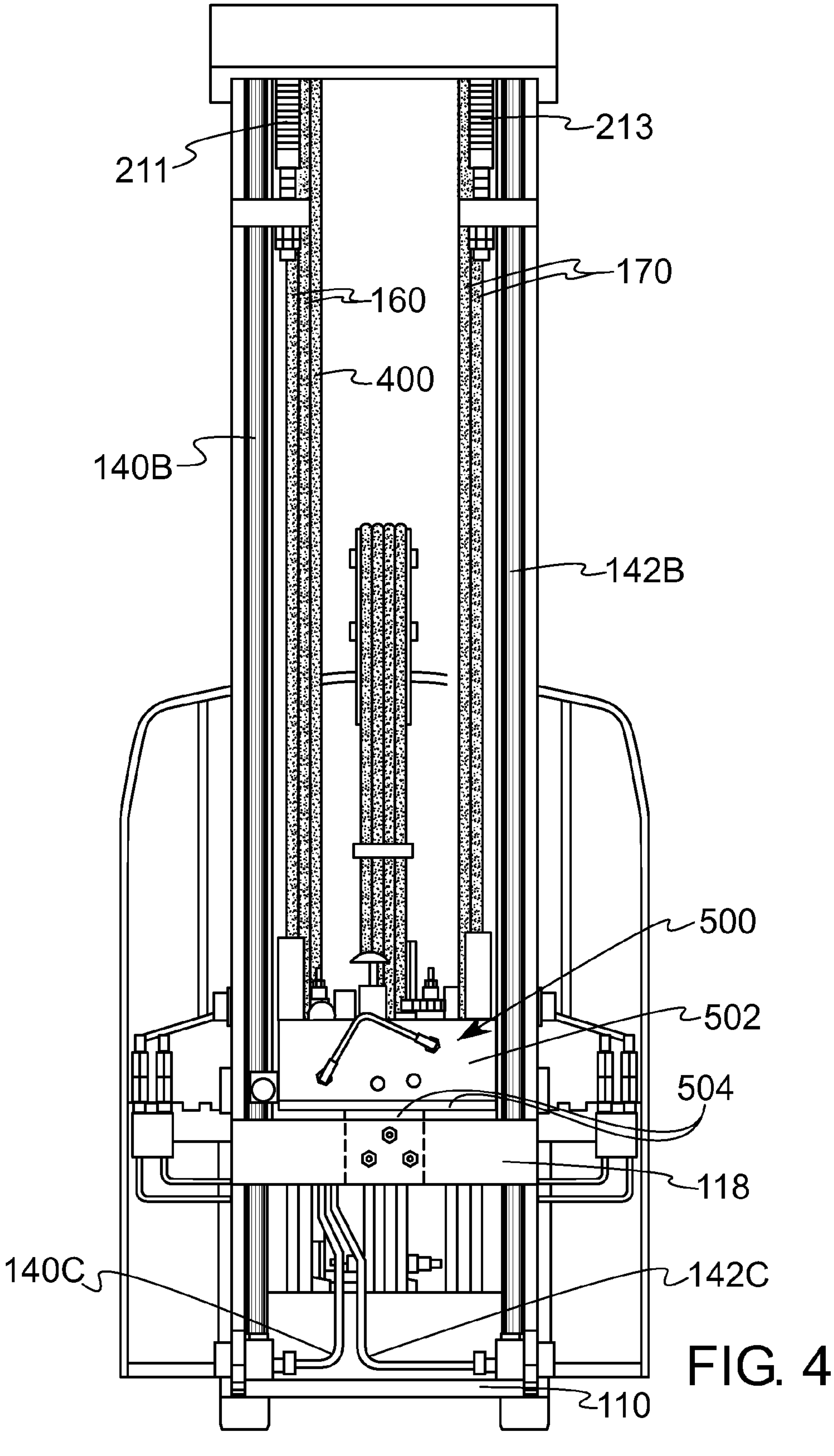
FIG. 4 is a rear view of the mast assembly, manifold apparatus and fork carriage assembly lift unit.
Figure 5:
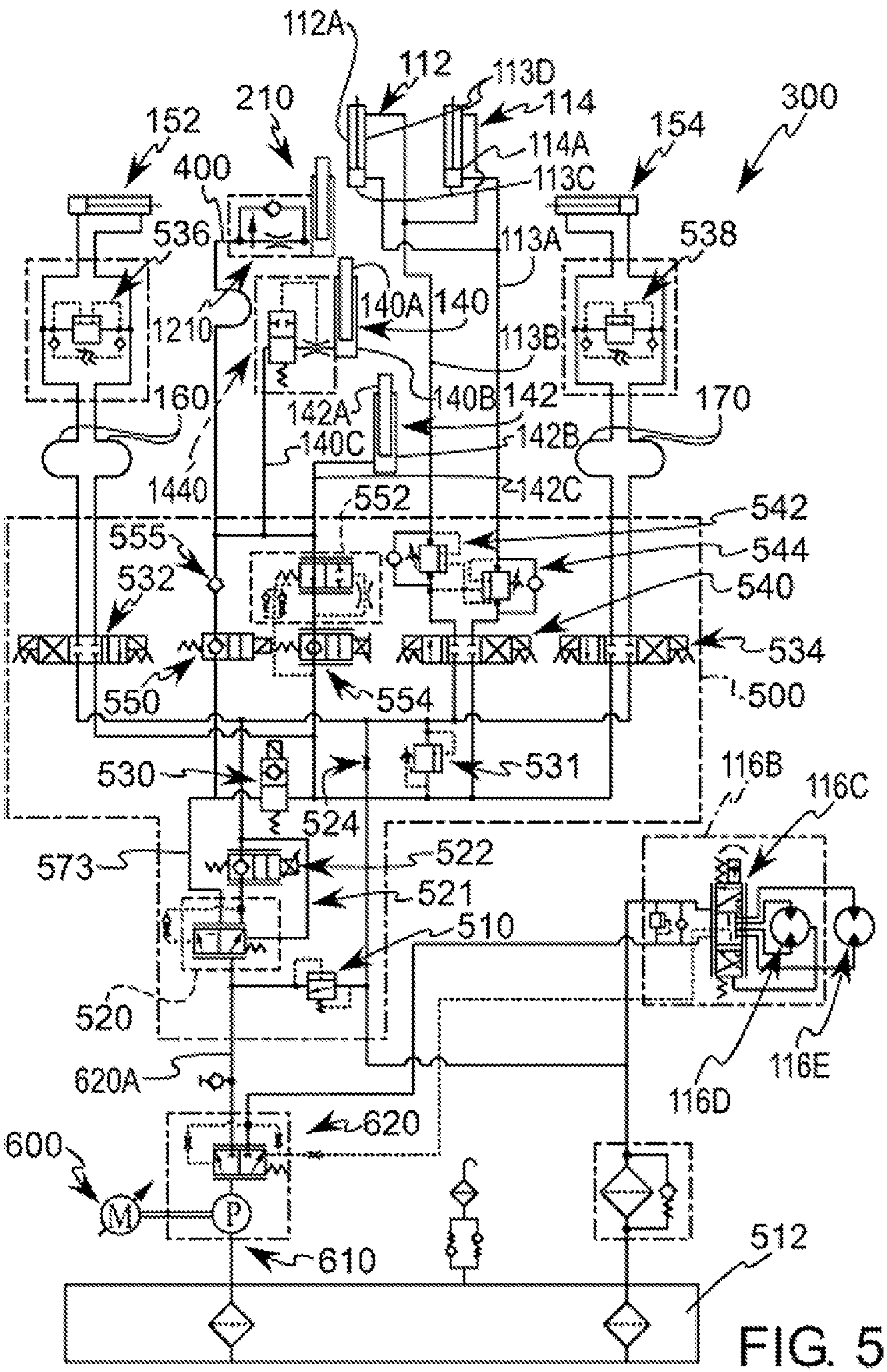
FIG. 5 is a schematic hydraulic circuit diagram for the hydraulic fluid supply system of the truck illustrated in FIG. 1.

The ram/cylinder assembly 210 may include coupling structure 260, see FIG. 2, for coupling a hydraulic fluid supply hose 400, see FIGS. 4 and 5, to the cylinder 212. The coupling structure 260 is more explicitly described in patent application U.S. Ser. No. 11/236,081, entitled "FLUID SUPPLY HOSE COUPLING STRUCTURE FOR A MATERIALS HANDLING VEHICLE," filed on Sep. 27, 2005, which application is hereby incorporated by reference herein. The hose 400 is coupled to the manifold apparatus 500 so as to supply hydraulic fluid to the ram/cylinder assembly 210.

The fork carriage assembly 150 may further comprise one or two conventional auxiliary devices 152 and 154, shown schematically in FIG. 5, which may comprise a fork side shift mechanism, a carton clamp, a fork reach mechanism, a paper roll clamp or a slip sheet device. Operator commands for controlling each auxiliary device 152, 154 are input via the multifunction controller MFC. Each auxiliary device 152, 154 may be coupled to a pair of hydraulic fluid hoses (supply/return). In the illustrated embodiment, first and second pairs of hydraulic fluid hoses 160 and 170 are provided for respectively providing hydraulic fluid to the two separate auxiliary devices 152 and 154, see FIG. 5. It is noted that zero or one auxiliary device may be provided as part of the fork carriage assembly 150 instead of two auxiliary devices.

As noted above, steering is effected via the tiller 116A. Rotation of the tiller 116A controls operation of a steering control unit 116B, which comprises a rotary valve 116C and a hydraulic motor 116D, see FIG. 5. The valve 116C is coupled to the tiller 116A and functions to control direction and magnitude of fluid flow to the motor 116D based on tiller 116A movement. Steering of the truck third wheel is effected via a hydraulic motor 116E, which is coupled to the third wheel, and receives hydraulic fluid from the motor 116D. The motor 116D functions to control the volume of hydraulic fluid per unit turn of the tiller 116A sent to the hydraulic motor 116E. The steering control unit 116B and the motor 116E form part of the hydraulic fluid supply system 300 and are mounted on the truck main body frame 14.

The hydraulic fluid supply system 300 further comprises a variable speed motor 600, which drives a positive displacement pump 610. The pump 610 has a broad speed range, e.g, from about 100 RPM to about 4000 RPM, and is commercially available from Eckerle Industrie Elektronik GmbH under the product designation EIPS2. The motor 600 is controlled via a controller (not shown). A mechanical dynamic load sensing priority flow divider valve 620, which, in the illustrated embodiment, is incorporated into the pump 610, functions as a priority valve such that the steering control unit 116B receives hydraulic fluid flow priority over all other hydraulic functions, see FIG. 5. That is, a given fluid flow required by the steering control unit 116B to allow proper operation of the steering unit 116B is provided by the valve 620 before fluid flow passes through the valve 620 to the manifold apparatus 500.

Figure 6:
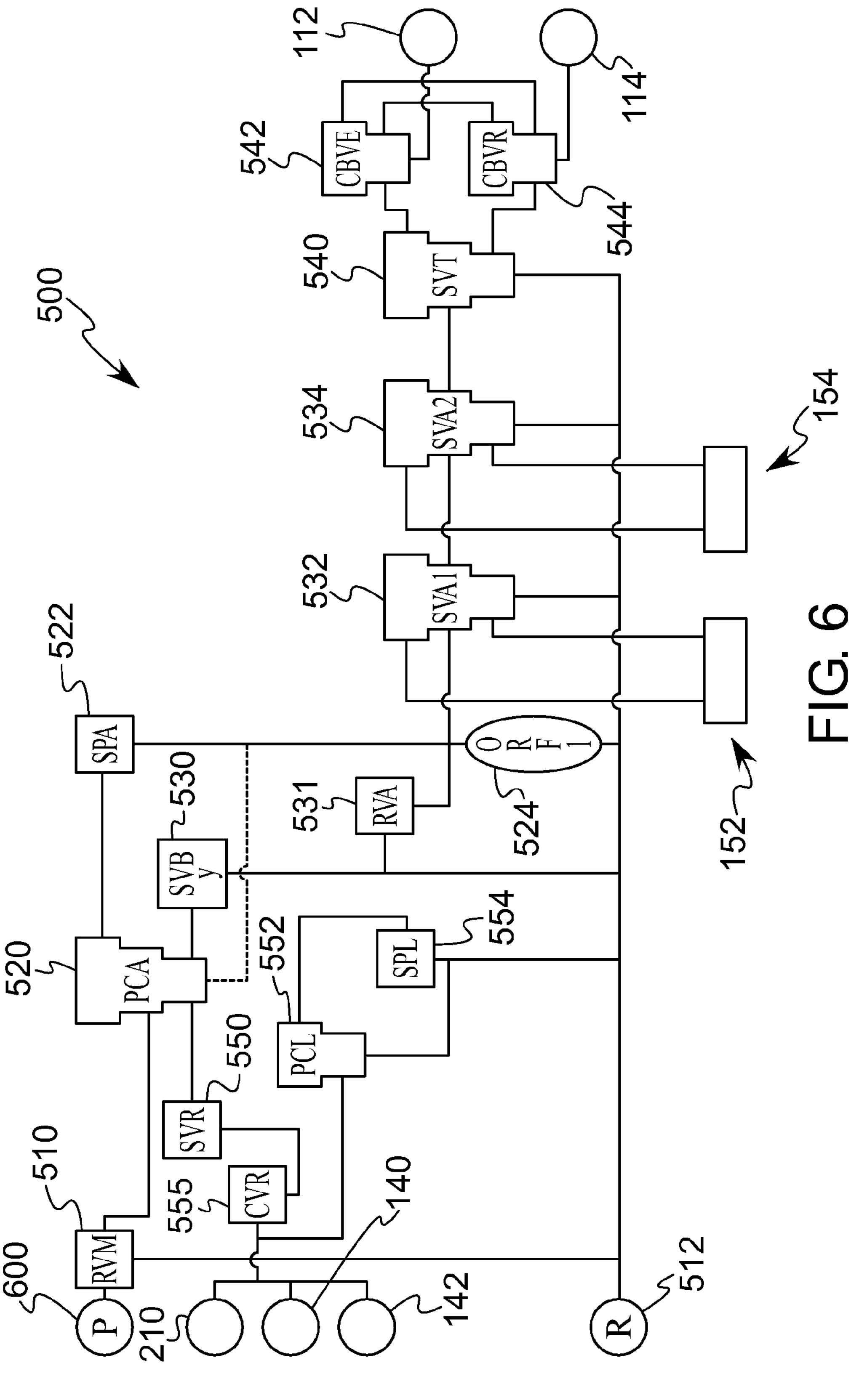
FIG. 6 is a hydraulic circuit diagram for the manifold apparatus.
Figure 6A:
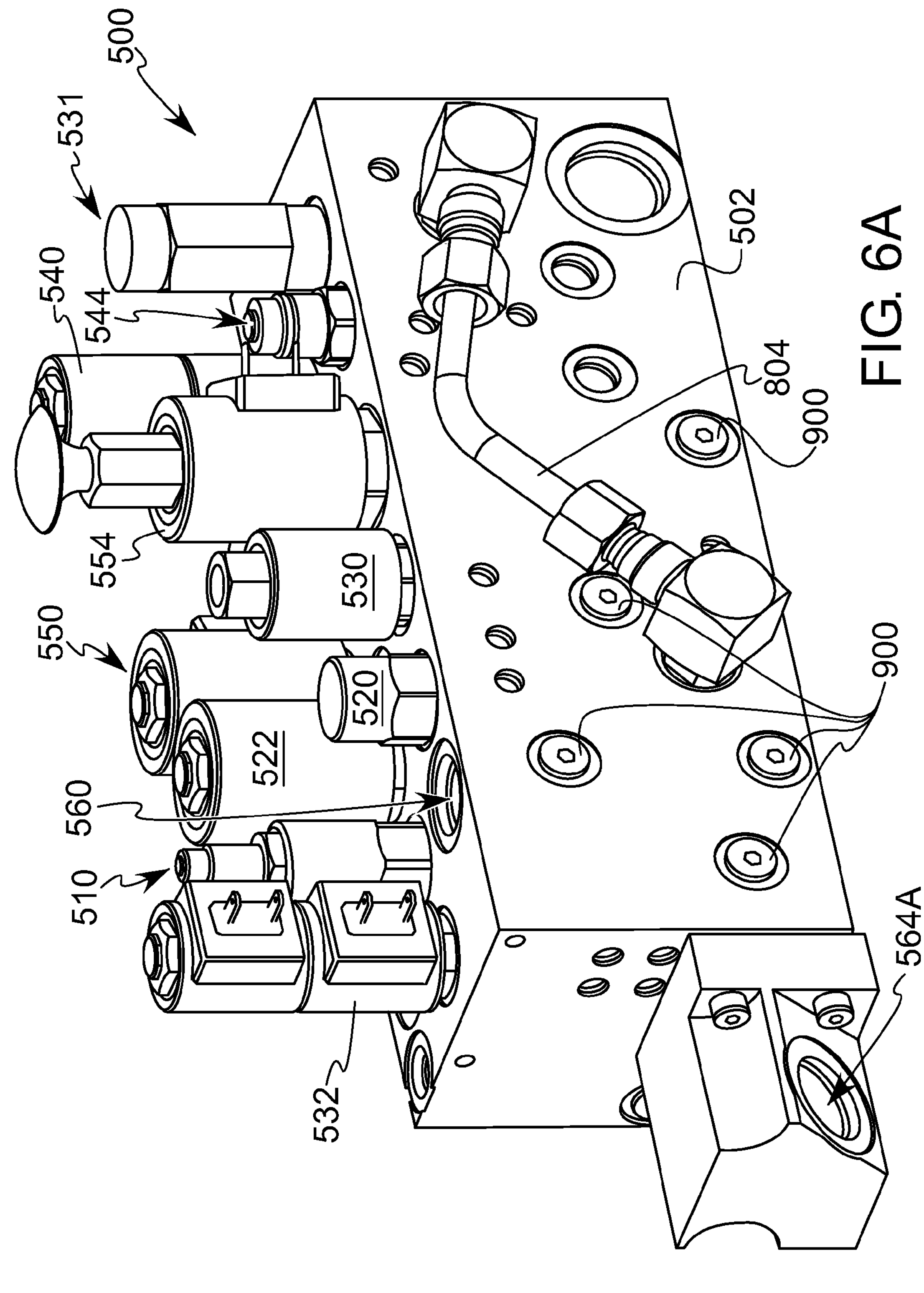
FIGS. 6A, 6B are perspective views of the manifold apparatus.
Figure 6B:
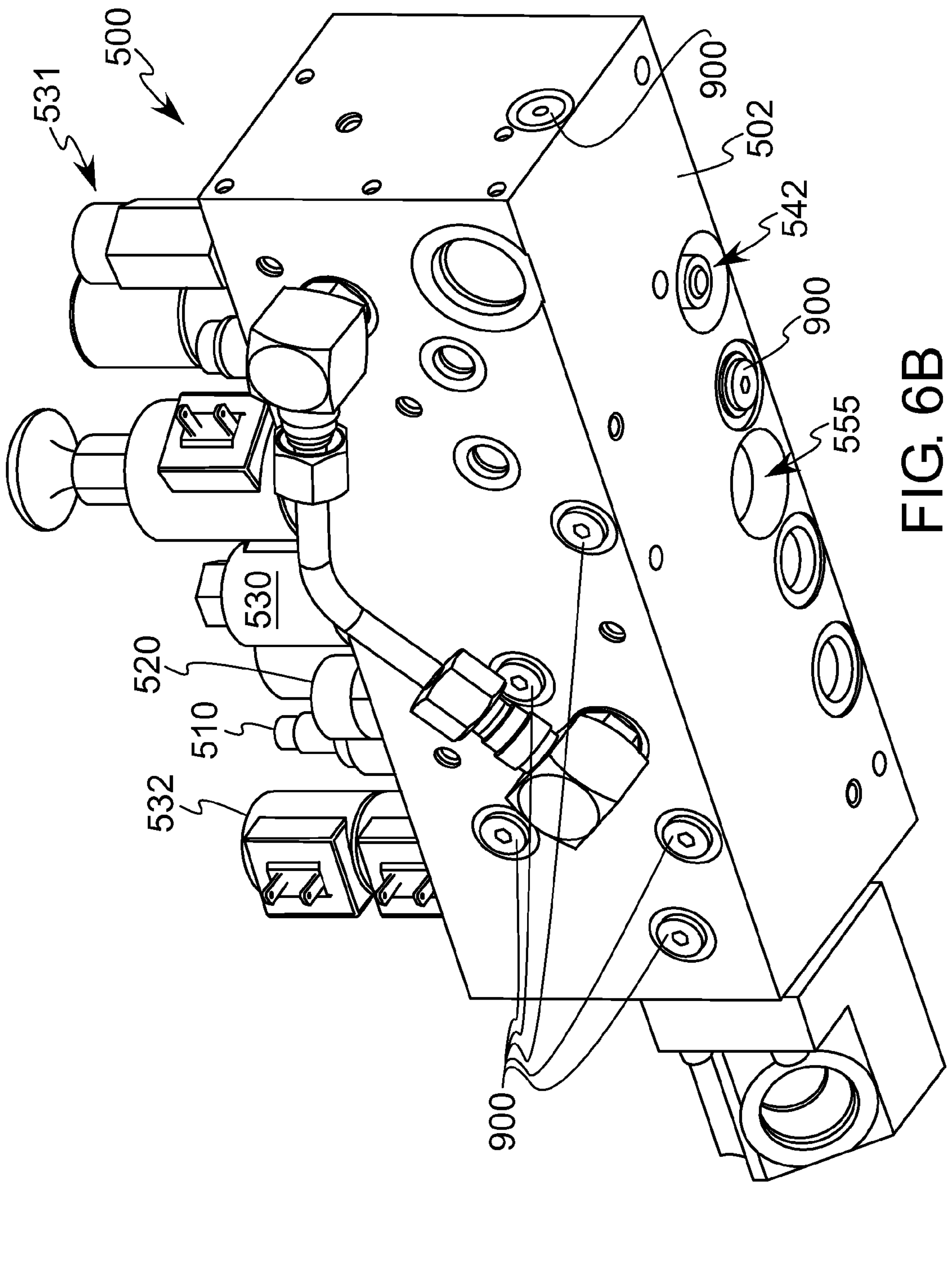

The manifold apparatus 500 includes an aluminum manifold block 502, see FIGS. 6A and 6B. In the illustrated embodiment, the manifold block 502 has a height of about 4 inches, a length of about 14.5 inches and a width of about 4 inches. In the illustrated embodiment, the manifold block 502 is coupled to a U-shaped support 118 of the first weldment 110 via a T-shaped support 504 bolted or otherwise coupled to the manifold block 502 and the U-shaped support 118, see FIGS. 2-4. It is noted that the first weldment 110 may move or tilt about an axis A via the first and second tilt ram/cylinder units 112 and 114, but does not move vertically relative the truck main body frame 14, see FIG. 2. The manifold block 502 is sized so as to fit on the support 118, yet not contact any moving elements on the mast assembly 100 or a hood plate 19 coupled to the frame 14 when the mast assembly 100 is positioned at any one of its angular positions relative to the main body frame 14.

A fluid line 620A extends from the valve 620 to the manifold block 502, see FIG. 5, and connects via a fitting (not shown) to a port 560 in the manifold block 502, see FIGS. 6A and 7-9. The fluid line 620A may comprise one or more hoses or metal tubes.

The manifold apparatus 500 further includes a mechanical main relief valve 510, one of which is commercially available from Hydraforce, Inc. under the product designation "RV10-22A," see FIGS. 5, 6 and 6A. The valve 510 is received in a cavity 562 provided in the manifold block 502, see FIGS. 8 and 9, and functions to divert hydraulic fluid from the manifold block 502 to a hydraulic fluid storage reservoir 512 mounted on the truck main body frame 14 should the pressure within the manifold block 502 exceed a first threshold pressure value. The cavity 562 communicates with passages 564 in the manifold block 502, see FIG. 9, which drain to an outlet 564A, see FIGS. 6A and 9, coupled via a fluid line (not shown in FIGS. 6A and 9) the reservoir 512. The cavity 562 also communicates with port 560 and cavity 566 via passages 567, see FIG. 9.

Figure 10:
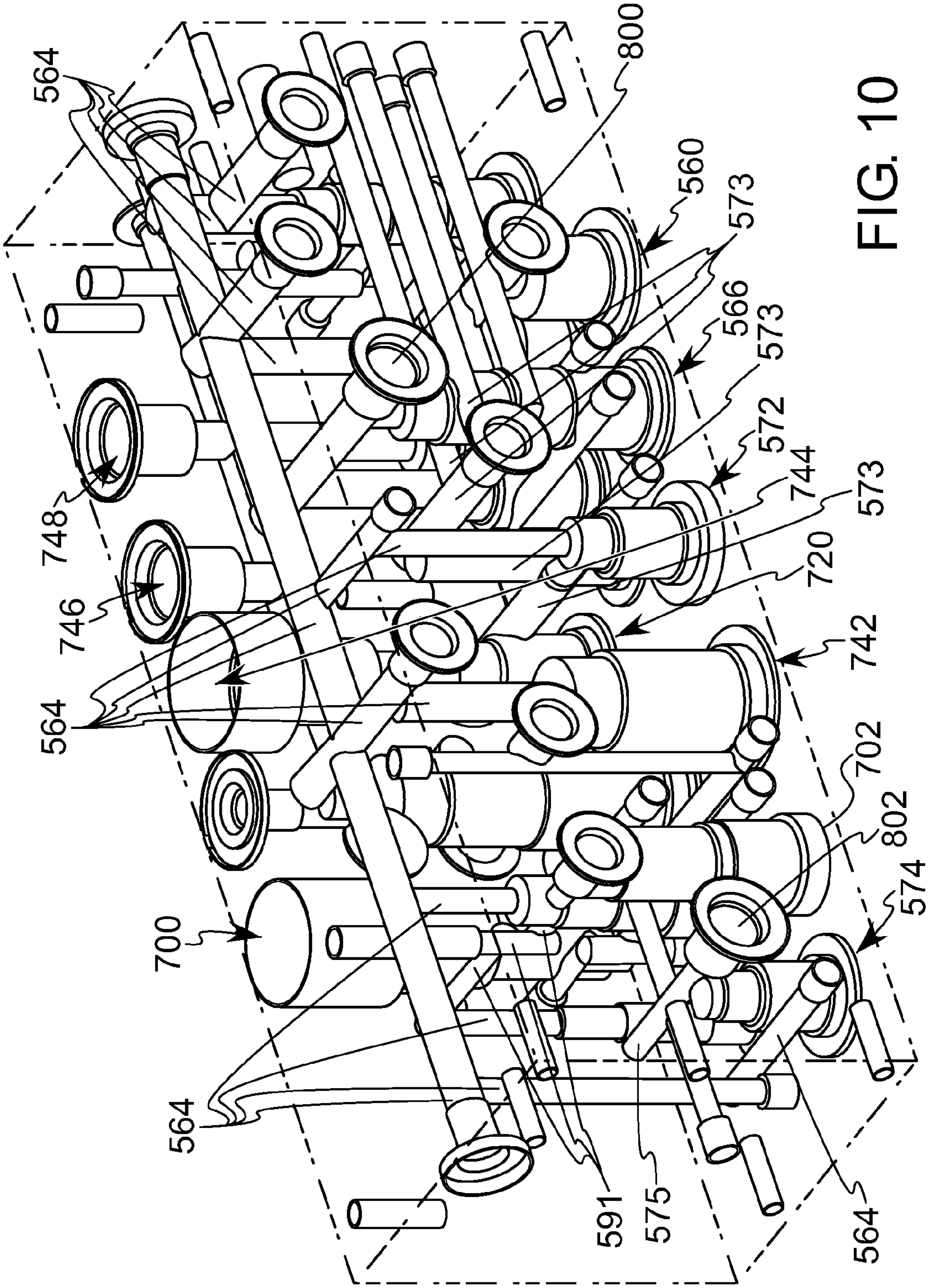

The manifold apparatus 500 further includes a mechanical static load sensing priority flow divider valve 520, one of which is commercially available from Hydraforce, Inc. under the product designation "EC10-42" and a normally closed solenoid-operated proportional poppet valve 522, one of which is commercially available from Hydraforce, Inc. under the product designation "SP10-20," see FIGS. 5, 6 and 6A. The valve 520 is received in the cavity 566 in the manifold block 502 while the valve 522 is received in a cavity 568 in the manifold block 502. As noted above, the cavity 566 communicates with port 560 and cavity 562 via the passages 567. Cavity 566 also communicates with cavity 568 via passages 569, and cavities 720 and 572 via passages 573, wherein the passages 569 and 573 are in the manifold block 502, see FIGS. 7, 8 and 10. Cavity 568 further communicates with cavity 578 via passages 579, see FIG. 7, and cavities 570 and 574 via passages 575 and 579 within the manifold block 502 and a hydraulic fluid line 804 connected outside of the manifold block 502 via fittings to ports 800 and 802, see FIGS. 6A, 7 and 10.

The valve 522 is electronically controlled via a controller (not shown) in response to commands input via the multifunction controller MFC and functions to provide required fluid flow to the first and second tilt ram/cylinder units 112 and 114 or one of the auxiliary devices 152 and 154, i.e., the valve 522 controls fluid flow to the tilt ram/cylinder units 112, 114 or an auxiliary device 152, 154. The valve 520 functions as a priority valve so as to provide a constant pressure drop across the valve 522 prior to providing fluid flow to the ram/cylinder assembly 210 and the first and second lift ram/cylinder assemblies 140 and 142. A constant pressure drop is provided across the valve 522 by the valve 520 regardless of whether the valve 522 is open or closed.

Figure 7:
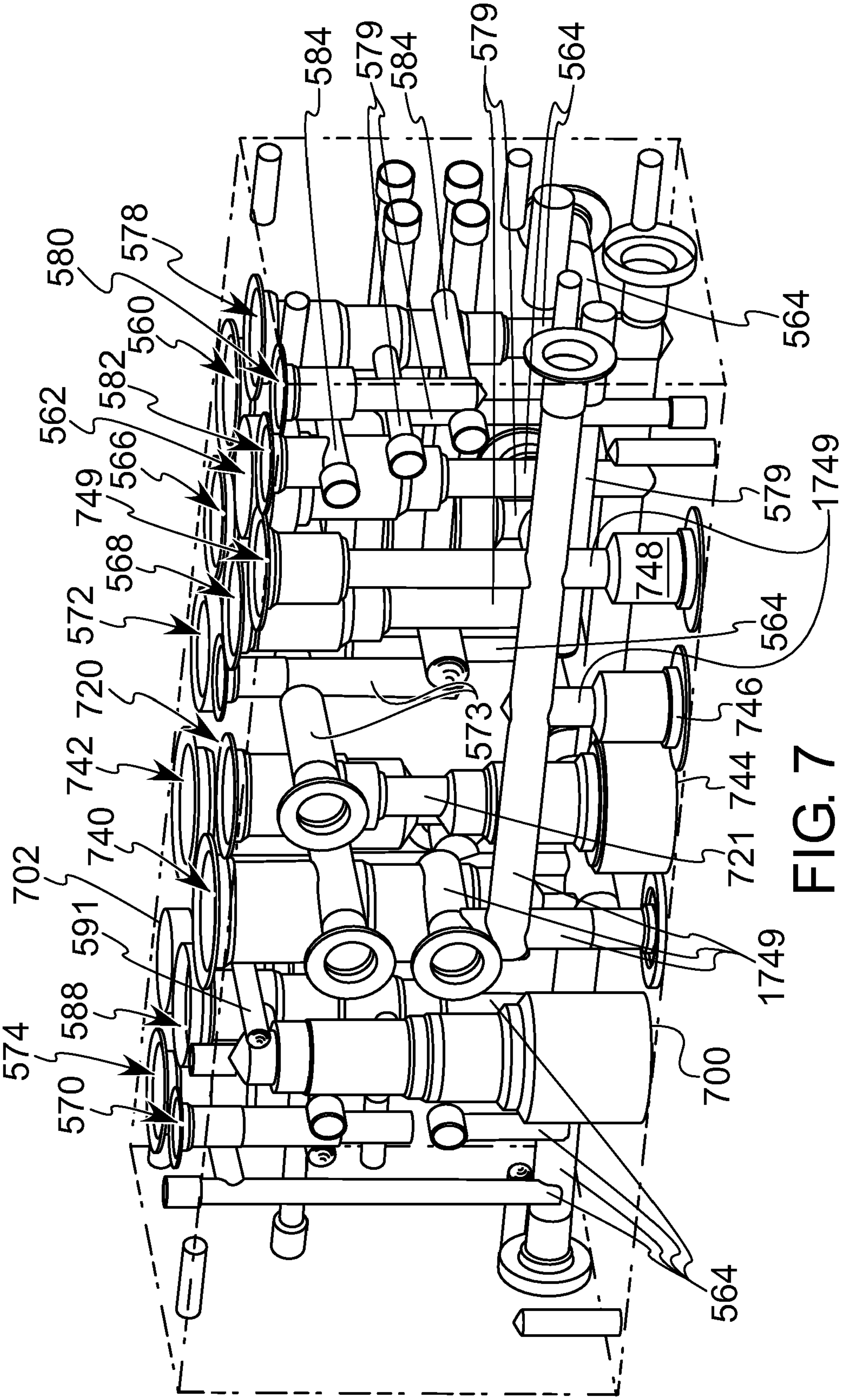
FIGS. 7-10 are views illustrating ports, cavities and internal passages of the manifold apparatus block.

An orifice 524 having a diameter of about 0.015 inch is received in the cavity 570 in the manifold block 502, see FIGS. 5-7. The cavity 570 communicates with the passages 564 in the manifold block 502, see FIGS. 7 and 8. The cavity 570 also communicates with cavity 574 via the passages 575, see FIGS. 8 and 10, and cavities 568 and 578 via the passages 575 and 579 and the hydraulic fluid line 804 connected outside the manifold block 502 via fittings to the ports 800 and 802, see FIGS. 6A, 7 and 10. The orifice 524 functions to drain fluid from a passage 521, which forms part of passages 579, see FIG. 7, to the reservoir 512 such that the pressure in the passage 521 is near 0 when the valve 522 is closed. With the pressure in the passage 521 near 0 when the valve 522 is closed, the valve 520 is capable of passing fluid to the ram/cylinder assembly 210 and the first and second lift ram/cylinder assemblies 140 and 142 more efficiently, i.e., at a lower pressure value at an input to the valve 520.

The manifold apparatus 500 also comprises an electronically controlled solenoid-operated normally open poppet valve 530, one of which is commercially available from Hydraforce, Inc. under the product designation "SV08-21," see FIGS. 5, 6 and 6A. The valve 530 is received in the cavity 572 provided in the manifold block 502. The cavity 572 communicates with the passages 564 in the manifold block 502, see FIG. 7. As noted above, the cavity 572 also communicates with the cavities 566 and 720 via passages 573, see FIG. 8. The valve 530 is closed by the controller when fluid flow is required to be provided to the ram/cylinder assembly 210 and the first and second lift ram/cylinder assemblies 140 and 142. The valve 530 is allowed to return to its normally open state by the controller when a lift operation is not being effected. Hence, fluid that passes from the valve 520 into a passage 573 to the valve 530, passes through the opened valve 530 to the reservoir 512.

The manifold apparatus 500 further includes a secondary relief valve 531, one of which is commercially available from Hydraforce, Inc. under the product designation "RV08-20A," which is received in the cavity 574 provided in the manifold block 502, see FIGS. 5, 6, 6A and 7-10. The cavity 574 communicates with the passages 564 in the manifold block 502, see FIG. 10. As noted above, the cavity 574 also communicates with the cavity 570 via the passages 575, see FIG. 8, and cavities 568 and 578 via the passages 575 and 579 and the hydraulic fluid line 804 connected outside the manifold block 502 via fittings to the ports 800 and 802, see FIGS. 6A, 7 and 10. The valve 531 functions to limit the maximum pressure of fluid provided to the first and second tilt ram/cylinder units 112 and 114 or an auxiliary device 152, 154 to a value below a second pressure threshold value, wherein the second threshold value is less than the first threshold value.

The manifold apparatus 500 additionally comprises first and second electronically controlled 3-position 4-way solenoid-operated valves 532 and 534, each of which is commercially available from Hydraforce, Inc. under the product designation "SV08-47C," see FIGS. 5, 6 and 6A (only valve 532 is illustrated in FIG. 6A). For a high fluid flow auxiliary device, the 3-position 4-way solenoid-operated valve 532, 534 may comprise a valve which is commercially available from Hydraforce, Inc. under the product designation "SV10-47C." The valve 532 is received in a cavity 578 provided in the manifold block 502. The cavity 578 communicates with the passages 564 in the manifold block 502, see FIG. 7. The cavity 578 also communicates with ports 580 and 582 via passages 584, cavity 568 via the passages 579, and cavities 570 and 574 via the passages 575 and 579 and the hydraulic fluid line 804 connected outside the manifold block 502 via fittings to the ports 800 and 802, see FIGS. 6A, 7 and 10. The first pair of hydraulic fluid hoses 160 are coupled to the ports 580 and 582 via fittings (not shown). The valve 534 is received in a cavity, not shown in FIGS. 6A, 6B and 7-10, positioned at an opposite end of the manifold block 502 from cavity 578. The second pair of hydraulic fluid hoses 170 are coupled to ports (not shown) positioned at an opposite end of the manifold block 502 from the ports 580 and 582. The ports receiving the hoses 170 are coupled to the cavity receiving the valve 534. The cavity receiving the valve 534 is also coupled to the cavity 578 receiving the valve 532 via passages 575 and 579 and the fluid line 804. The cavity receiving the valve 534 is further coupled to a cavity 588.

In response to a command generated by the multifunction controller MFC to effect operation of the auxiliary device 152, the controller opens the valve 522 and actuates the valve 532 such that the valve 532 provides hydraulic fluid flow in one of the two first hydraulic fluid hoses 160 coupled to the auxiliary device 152 and the manifold block 502. For example, if the auxiliary device 152 comprises a fork side shift ram/cylinder assembly, a first of the two fluid hoses 160 receives pressurized fluid corresponding to side shift movement to the right. If side shift movement to the left is requested, a second of the two fluid hoses 160 receives pressurized fluid. In a similar manner, in response to a command generated by the multifunction controller MFC to effect operation of the auxiliary device 154, the controller opens valve 522 and actuates the valve 534 such that the valve 534 provides hydraulic fluid flow in one of the two second hydraulic fluid hoses 170 coupled to the auxiliary device 154 and the manifold block 502.

First and second cross-over relief valves 536 and 538 may be mounted on the fork carriage 154A, see FIG. 5. The first relief valve 536 functions to divert hydraulic fluid from its corresponding auxiliary device 152 back through the valve 532 to the fluid storage reservoir 512 if the fluid pressure provided to the auxiliary device 152 exceeds a third threshold value, wherein the third threshold value is less than the first and second threshold values. The second relief valve 538 functions to divert hydraulic fluid from its corresponding auxiliary device 154 back through the valve 534 to the fluid storage reservoir 512 if the fluid pressure provided to the auxiliary device 154 exceeds the third threshold value.

The manifold apparatus 500 additionally comprises a third electronically controlled 3-position 4-way solenoid-operated valve 540, which is commercially available from Hydraforce, Inc. under the product designation "SV08-47C." The valve 540 is received in a cavity 588 provided in the manifold block 502. The cavity 588 communicates with the passages 564 in the manifold block 502, see FIG. 8 as well as the cavity receiving the valve 534. The cavity 588 also communicates with cavity 700 via passages 591, see FIG. 10, and cavity 702 via passages 594, see FIG. 8.

In response to a command generated by the multifunction controller MFC to tilt the mast assembly 100 in a direction toward or away from the truck main body frame 14 via the first and second tilt ram/cylinder units 112 and 114, the controller opens valve 522 and actuates the valve 540 such that the valve 540 provides fluid flow to either fluid hose 113A or fluid hose 113B. When fluid flow is provided to the first hose 113A, hydraulic fluid is provided to a first end 113C of each of the cylinders 112A and 114A of the first and second tilt units 112 and 114 to effect movement of the mast assembly 100 in a direction away from the truck main body frame 14. When fluid flow is provided to the second hose 113B, hydraulic fluid is provided to a second end 113D of each of the cylinders 112A and 114A of the first and second tilt units 112 and 114 to effect movement of the mast assembly 100 in a direction toward the truck main body frame 14.

First and second counter-balance valves 542 and 544 are coupled to the manifold block 502, see FIGS. 6A and 6B. The first valve 542 is received in the cavity 700, while the second valve 544 is provided in the cavity 702, see FIG. 7-10. As noted above, cavity 700 communicates with cavity 588 via passages 591, see FIG. 10, and cavity 702 communicates with cavity 588 via passages 594, see FIG. 8. Cavity 700 communicates with a port 704 via passages 706, see FIG. 8. Cavity 702 communicates with a port 708 via a passage 709, see FIG. 8. Hydraulic hose 113B is coupled to the port 704 via a fitting (not shown). Likewise, hydraulic hose 113A is coupled to the port 708 via a fitting (not shown). Cavity 700 communicates with cavity 702 via passages 591, 594 and cavity 588.

The valves 542 and 544 are commercially available from Sun Hydraulics Corporation under the product designation "CBBY-LHN." The valves 542, 544 function to prevent the rate of tilt of the mast assembly 100 from exceeding a desired value. That is, once the mast assembly crosses over vertical when moving from a position near the main body frame 14 to a position away from the main body frame 14 or vice versa, a corresponding counter-balance valve 542, 544 prevents the mast assembly 100 from moving at an accelerated rate, i.e, at an undesirable rate.

To control movement of the fork carriage assembly 150 relative to the third weldment 110 as well as movement of the second and third weldments 120 and 130 relative to the first weldment 110, the manifold apparatus 500 includes a normally closed solenoid operated two-way poppet type valve 550, one of which is commercially available from Hydraforce, Inc. under the product designation "SV10-20"; a mechanical pressure compensator valve 552, one of which is commercially available from Hydraforce, Inc. under the product designation "EC12-34"; a normally closed proportional solenoid-operated two-way poppet type valve 554, one of which is commercially available from Hydraforce, Inc. under the product designation "SP12-20J"; and a check valve 555, one of which is commercially available from Hydraforce, Inc. under the product designation "CV10-20," see FIGS. 5, 6, 6A and 6B (valve 552 is not shown in FIGS. 6A and 6B). The valve 550 is received in cavity 720, valve 552 is received in cavity 740, valve 554 is received in cavity 742 and the check valve 555 is received in cavity 744.

Figure 8:
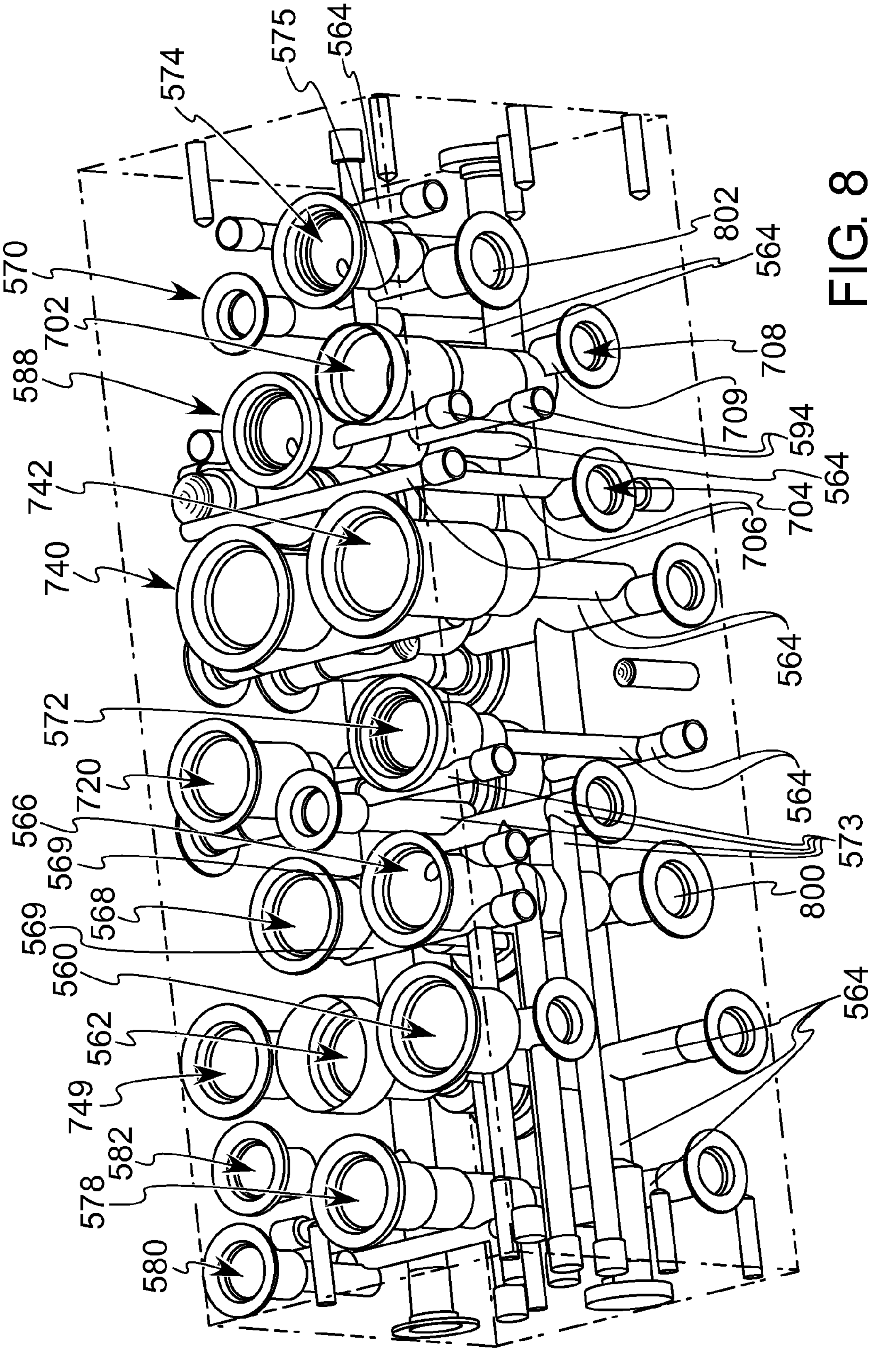
Figure 9:
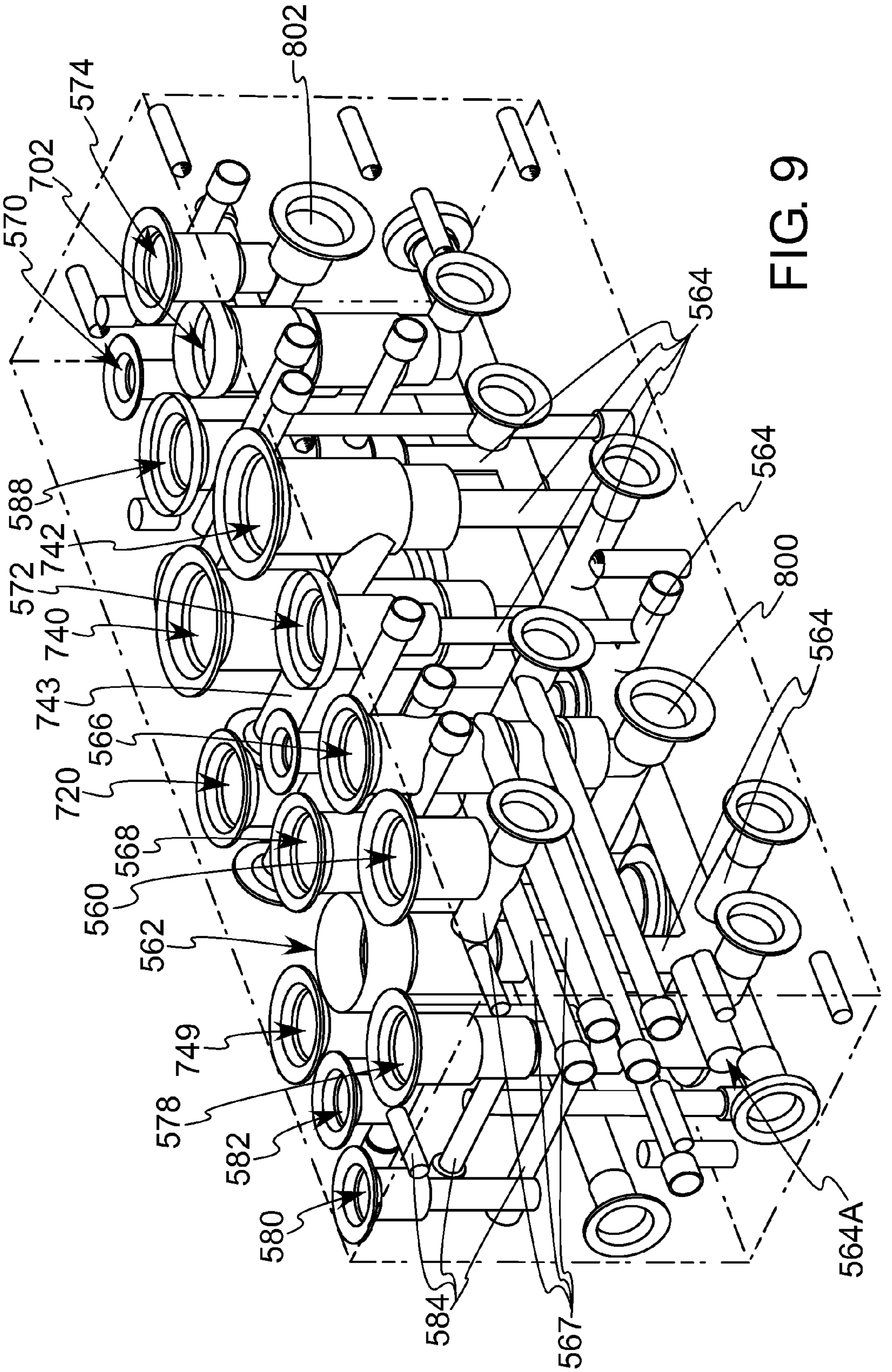

As noted above, the cavity 720 communicates with the cavity 566 via the passages 573, see FIGS. 7 and 8. The cavity 720 also communicates with the cavity 744 via passage 721, see FIG. 7. The cavity 740 communicates with cavity 742 via passage 743, see FIG. 9. Cavity 740 also communicates with cavity 744 and ports 746, 748 and 749 via passages 1749, see FIG. 7. Cavities 740 and 742 also communicate with the passages 564 in the manifold block 502, see FIG. 7.

The hydraulic fluid supply hose 400 is coupled via a fitting (not shown) to the port 749. The first hydraulic tube 140C is coupled via a fitting (not shown) to the port 746, while the second hydraulic tube 142C is coupled via a fitting (not shown) to the port 748.

In response to a command generated by the multifunction controller MFC to lift the fork carriage assembly 150, the controller closes valve 530 and actuates valve 550 so as to provide fluid flow to the ram/cylinder assembly 210 and the first and second lift ram/cylinder assemblies 140 and 142. It is noted that the projected area at the base of the ram of the ram/cylinder assembly 210 is approximately equal to the combined projected base areas of the rams of the first and second lift assemblies 140 and 142. Because the load experienced by the ram/cylinder assembly 210 is less than the load experienced by the first and second lift ram/cylinder assemblies 140 and 142, the fork carriage assembly 150 moves relative to the third weldment 130 prior to the second and third weldments 120 and 130 moving relative to the first weldment 110. Once the fork carriage assembly 150 has moved to its upper-most position relative to the third weldment 130, the rams 140A and 142A extend from their corresponding cylinders 140B and 142B to effect movement of the second and third weldments 120 and 130 relative to the first weldment 110, which movement is discussed above.

Valve 552 functions to maintain a pressure drop across valve 554 constant. Valve 554 is opened when the fork carriage assembly 150 and the second and third weldments 120 and 130 are to be lowered from a raised state. The check valve 555 functions to prevent load drift, i.e., to prevent the carriage assembly 150 and the second and third weldments 120, 130 from drifting downward after being raised.

Cavities, ports or openings in the manifold block 502 which do not receive an element such as valve, a tube, a hose or coupling are closed by plugs 900 (shown only in FIGS. 6A and 6B).

Figure 11:
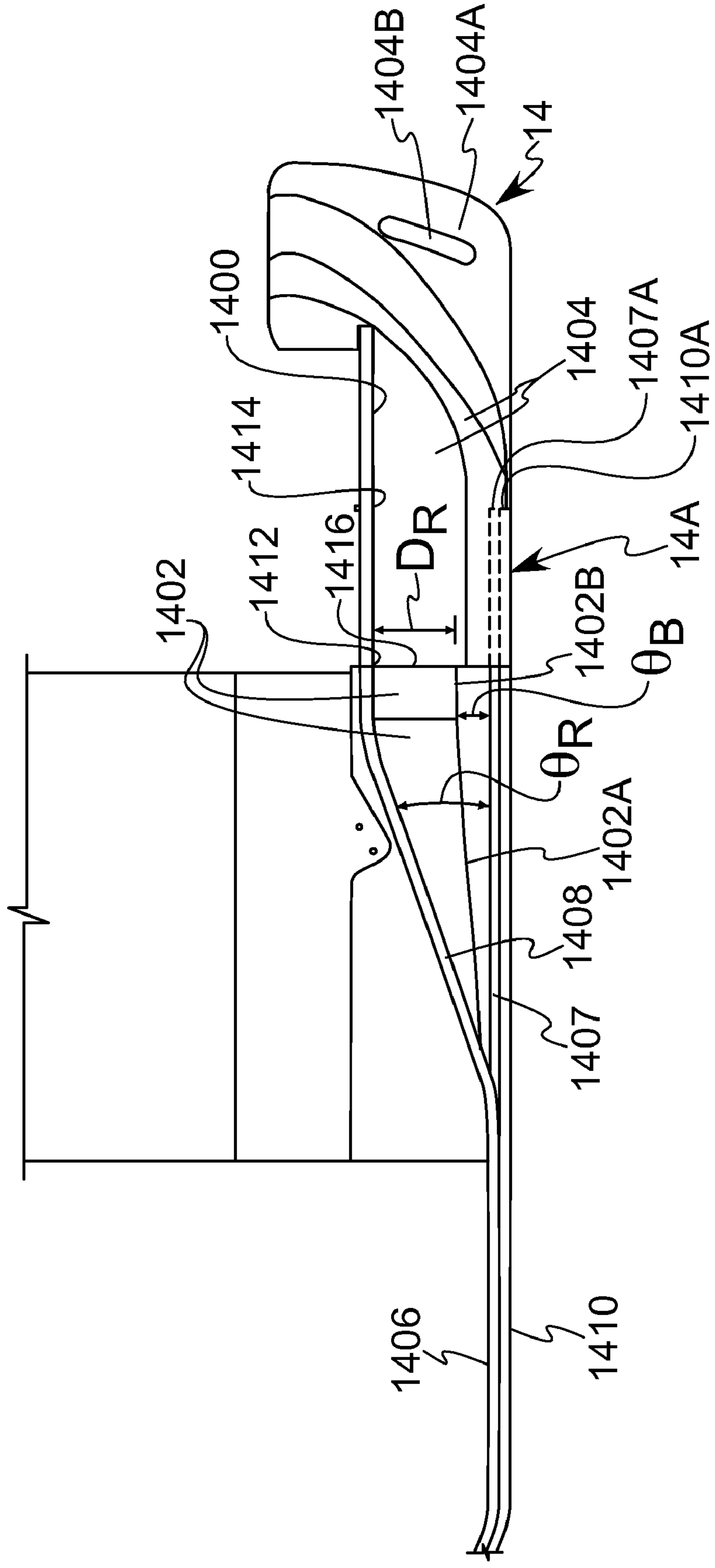
FIG. 11 is a top view of a portion of the truck power unit frame.

Typically, a manifold apparatus may be mounted on a front portion of the truck main body frame. In the illustrated embodiment, due in part to the manifold apparatus 500 being positioned on the first weldment 110, the truck main body frame 14 is shaped to include a recess 14A at the front right corner of the frame 14, see FIGS. 1, 1A and FIG. 11. In the illustrated embodiment, the left corner of the frame 14 does not include such a recess, see FIG. 1B. However, it is contemplated that such a recess could be provided only in the frame left corner, in both the left and right corners or inwardly of a corner.

In the illustrated embodiment, the recess 14A is defined by an indented sidewall 1400, a brow plate 1402 and a front fender 1404, all of which define portions of the frame 14. The indented sidewall 1400 is substantially parallel to a rear sidewall 1406. A base sidewall 1407 is positioned below and in substantially the same vertical plane as the rear sidewall 1406, is integral with the rear sidewall 1406 and has an end point 1407A. The base sidewall 1407 is also positioned next to a skirt plate 1410, which defines a bottom outer surface of the frame 14. The bottom skirt plate 1410 terminates at an end point 1410A near the base sidewall end point 1407A. An intermediate sidewall 1408 extends between and is integral with the indented and rear sidewalls 1400 and 1406. A substantially horizontal part of the brow plate 1402 is adjacent the intermediate sidewall 1408. The intermediate sidewall 1408 extends at an angle $\Theta R$ of about 19.8 degrees with a vertical plane containing the base sidewall 1407. The rear sidewall 1406 is positioned above and slightly behind the bottom skirt plate 1410. The brow plate 1402 has first and second outer edges 1402A and 1402B, respectively. The indented sidewall 1400 extends inwardly from the second outer edge 1402B of the brow plate 1402 by a distance DR equal to about 87 mm. The first edge 1402A of the brow plate 1402 extends at an angle $\Theta_B$ of about 4.5 degrees with the vertical plane containing the base sidewall 1407. The indented sidewall 1400 is welded to a substantially vertical part of the brow plate 1402 at a vertical seam 1412 and to the fender 1404 at a seam 1414, see FIG. 11. The fender 1404 is welded to the vertical part of the brow plate 1402 at a seam 1416. The recess 14A provides an operator with improved visibility such that an operator having a height falling with a range of typical operator heights can view an outermost or front end portion 1404A of the front fender 1404. As illustrated in FIG. 1A, wheel 16 is positioned just below the fender 1404. A reflector 1404B is provided on the fender end portion 1404A. By being able to view the front fender end portion 1404A, it is believed that an operator can better anticipate when the wheel 16 just below the fender 1404 will pass over a bump or into a hole and better anticipate when to initiate and maneuver a turn.

As noted above, the first A-pillar 19A is positioned so as to be substantially in-line with the vertical rail 110B of the first weldment 110. Hence, the first A-pillar 19A does not block an operator's view as the operator looks to the right of the mast assembly 100 including when an operator looks down onto the fender front end portion 1404A, see FIG. 1F.

Figure 11A:
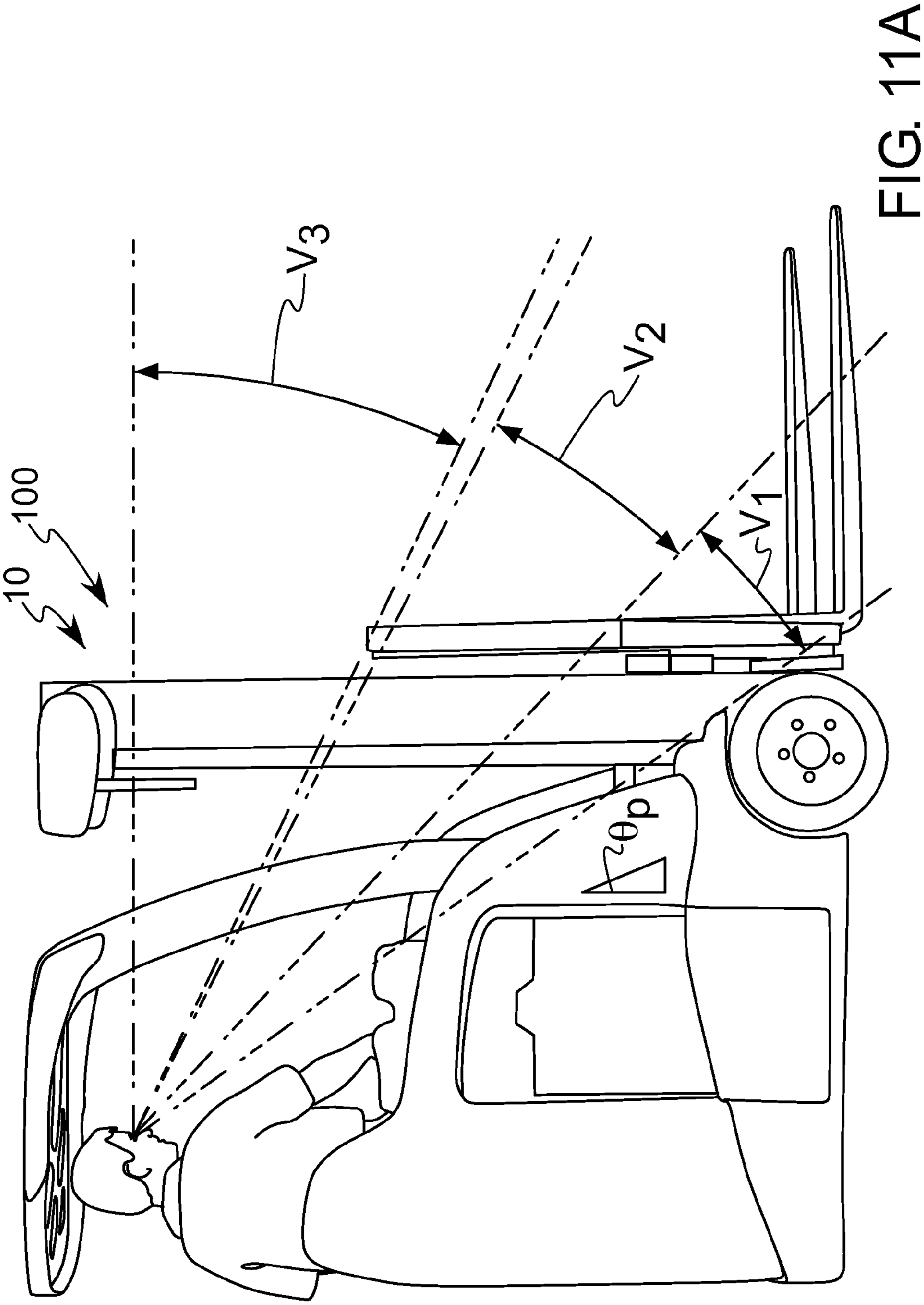
FIG. 11A is a side view of an embodiment of the truck illustrating enhanced visibility provided to an operator.

The improved downward visibility to the right side of the mast assembly 100 provided by the recess 14A and the position of the first A-pillar 19A relative to the mast assembly 100 is illustrated by view area $V_1$ in FIG. 11A. It is believed that a conventional truck provides an operator with a visibility corresponding only to view areas $V_2$ and $V_3$. Hence, in truck 10 of the illustrated embodiment, an operator has a view area equal to areas $V_1$, $V_2$ and $V_3$. The improved visibility is believed to result in enhanced maneuverability of the truck 10.

As noted above, the truck 10 further includes a front cowl or hood plate 19 coupled to the frame 14. In the illustrated embodiment, the highest point 19C on the plate 19 has a maximum height from ground of about 1124 mm, which is believed to be less than the highest point on most conventional materials handling vehicle front cowl plates. Further, the cowl plate 19 slopes downward at a steep angle, i.e., at an angle $\Theta_P$ equal to about 18 degrees, see FIG. 11A. The low maximum height and steep slope of the cowl plate 19 is believed to enhance visibility through the mast assembly 100, i.e., between the vertical rails 130B and 130C of the third weldment 130, see FIG. 2, and to at least the side (the left side in the illustrated embodiment) of the mast assembly 100 opposite the side (the right side in the illustrated embodiment) having the recess 14A.

A manifold apparatus cover 506 is provided over the manifold apparatus 500 to provide protection to the manifold apparatus 500, see FIG. 1C.

The controller controls the speed of the motor 600 such that the pump 610 generates a given fluid flow required by the steering control unit 116B to allow for proper operation of the steering unit 116B in response to movement of the tiller 116A along with a small amount of excess fluid flow. The controller also controls the speed of the motor 600 such that the pump 610 generates a given fluid flow required by the first and second tilt ram/cylinder units 112 and 114 or one of the auxiliary devices 152 and 154 in response to commands generated by the multifunction controller MFC along with a small of amount of excess fluid flow. The controller also controls the speed of the motor 600 such that the pump 610 generates a given fluid flow required by the ram/cylinder assembly 210 and the first and second lift ram/cylinder assemblies 140 and 142 to lift the carriage assembly 150 and the second and third weldments 120 and 130 at a desired rate in response to commands generated by the multifunction controller MFC with little or no excess fluid flow being generated. The speed at which the ram/cylinder assembly 210 and the first and second lift ram/cylinder assemblies 140 and 142 are actuated, i.e., the speed at which the fork carriage assembly 150 is raised relative to the third weldment 130 and subsequently the speed at which the second and third weldments 120 and 130 are raised relative to the first weldment 110, is controlled directly by controlling the speed of the motor 600.

It is further contemplated that the manifold apparatus 500 could be used in combination with a four-stage mast apparatus (not shown).

The first and second lift ram/cylinder assemblies 140 and 142 and/or the ram/cylinder assembly 210 may comprise a ram/cylinder assembly where a seal is provided at an end of the cylinder opposite a cylinder base such that the ram is extended when pressurized hydraulic fluid is provided to the cylinder at a location between the cylinder base and the cylinder seal. Such a ram/cylinder assembly is described in patent application U.S. Ser. No. 11/236,081, entitled "FLUID SUPPLY HOSE COUPLING STRUCTURE FOR A MATERIALS HANDLING VEHICLE," which has previously been incorporated by reference herein. Alternatively, the first and second lift ram/cylinder assemblies 140 and 142 and/or the ram/cylinder assembly 210 may comprise a ram/cylinder assembly where a seal is provided on the ram at the ram's lower end such that hydraulic fluid enters the cylinder at a location below the position of the seal when the ram is in its lowermost position in the cylinder. Such a ram/cylinder assembly is also described in the '081 patent application entitled "FLUID SUPPLY HOSE COUPLING STRUCTURE FOR A MATERIALS HANDLING VEHICLE," which has previously been incorporated by reference herein.

The definitions of the words or elements of the following claims shall include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims.

The claims are thus to be understood to include what is specifically illustrated and described above, what is conceptually equivalent, what can be obviously substituted and also what essentially incorporates the essential idea of the invention.

What is claimed is:

1. A stand-up materials handling vehicle comprising:

a power unit comprising:

a frame including a rear portion, a front portion, and an operator's compartment in which an operator may stand while operating the vehicle, and a plurality of wheels including a front wheel;

a mast assembly coupled to said frame;

at least one fork coupled to said mast assembly and positioned forward of said frame front portion; and wherein said frame further includes a front recess located in a front corner of said frame near or extending to said frame front portion and defined by an indented sidewall and a frame front section having at least a part located above and extending over said front wheel, said recess starting from behind said front wheel and said mast assembly and extending outward in a forward direction so as to allow an operator to view said frame front section part when driving said vehicle, and said recess is further defined by a plate, which further defines at least a portion of an open compartment in said frame positioned behind said recess, said compartment open in a direction substantially transverse to said indented sidewall.

2. A stand-up materials handling vehicle as set forth in claim 1, wherein said power unit further comprises a front hood plate having a maximum height from ground of less than or equal to about 1124 mm.

3. A stand-up materials handling vehicle as set forth in claim 2, wherein said front hood plate slopes at an angle of about 18 degrees relative to vertical.

4. A stand-up materials handling vehicle as set forth in claim 1, further including an overhead guard and first and second pillars for coupling said overhead guard to said power unit, wherein at least one of said pillars is positioned substantially in-line with said mast assembly and extends substantially vertically from said power unit.

5. A stand-up materials handling vehicle as set forth in claim 4, wherein said mast assembly includes at least one weldment having first and second vertical rails, said one pillar being substantially in-line with one of said vertical rails of said one weldment.

6. A stand-up materials handling vehicle as set forth in claim 5, wherein each of said first and second pillars is substantially in-line with a corresponding one of said vertical rails of said one weldment.

7. A stand-up materials handling vehicle as set out in claim 1, wherein said indented sidewall is substantially parallel to a rear sidewall, and an intermediate sidewall extends between and is integral with said indented and rear sidewalls.

8. A stand-up materials handling vehicle as set out in claim 7, wherein said plate comprises a brow plate comprising a substantially vertical part coupled to said indented sidewall and said frame front section and further comprising a substantially horizontal part adjacent to said intermediate sidewall and spaced from said frame front section.

9. A stand-up materials handling vehicle as set out in claim 8, wherein said indented sidewall extends inwardly from an outer edge of said brow plate.

10. A stand-up materials handling vehicle as set forth in claim 1, wherein said frame front section comprises a front fender and said frame front section part comprises an end portion of said fender provided over a front wheel of the vehicle.

11. A stand-up materials handling vehicle as set out in claim 1, wherein said plate and said indented sidewall are coupled to one another along a substantially vertical seam.

12. A stand-up materials handling vehicle as set out in claim 1, further comprising a fork carriage positioned forward of said front wheel, said at least one fork being mounted on said fork carriage.

13. A stand-up materials handling vehicle as set forth in claim 1, wherein said front recess extends to an outer corner edge of said frame front corner.

14. A stand-up materials handling vehicle comprising:

a power unit comprising:

a frame including a rear portion, a front portion, and an operator's compartment, and a plurality of wheels including a front wheel;

a mast assembly coupled to said frame;

at least one fork coupled to said mast assembly and positioned forward of said frame front portion; and wherein said frame further includes a front recess located in a front corner of said frame near or extending to said frame front portion and defined by an indented sidewall, a plate and a frame front section having at least a part located adjacent said front wheel, said recess starting from behind said front wheel and said mast assembly and extending outward in a forward direction so as to allow an operator to view said frame front section part when driving said vehicle, said plate also defining at least a portion of an open compartment in said frame positioned behind said recess, said compartment open in a direction substantially transverse to said indented sidewall.

15. A stand-up materials handling vehicle as set out in claim 14, wherein said recess is open in a forward direction opposite said frame rear portion.

16. A stand-up materials handling vehicle as set forth in claim 14, wherein said front recess extends to an outer corner edge of said frame front corner.

* * * * *